(12) United States Patent
Miyachi et al.

(10) Patent No.: US 7,768,589 B2
(45) Date of Patent: Aug. 3, 2010

(54) DISPLAY DEVICE

(75) Inventors: Koichi Miyachi, Soraku-gun (JP);
Kiyoshi Ogishima, Soraku-gun (JP);
Akihito Jinda, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 62 days.

(21) Appl. No.: 10/582,998

(22) PCT Filed: Dec. 17, 2004

(86) PCT No.: PCT/JP2004/018930

§ 371 (c)(1),
(2), (4) Date: Jun. 14, 2006

(87) PCT Pub. No.: WO2005/059637

PCT Pub. Date: Jun. 30, 2005

(65) Prior Publication Data

US 2007/0080370 A1     Apr. 12, 2007

(30) Foreign Application Priority Data

Dec. 18, 2003   (JP) .................... 2003-420967

(51) Int. Cl.
*G02F 1/136* (2006.01)
*G02F 1/1343* (2006.01)

(52) U.S. Cl. .................. 349/48; 349/38; 349/139; 349/141; 349/168; 349/171; 349/41

(58) Field of Classification Search .......... 349/33, 349/38, 41, 139, 141, 168, 170–171, 48; 257/107

See application file for complete search history.

(56) References Cited

U.S. PATENT DOCUMENTS 6,266,109 B1 * 7/2001 Yamaguchi et al. ............ 349/86

2003/0052847 A1 * 3/2003 Okishiro et al. .............. 345/87
2003/0090448 A1 * 5/2003 Tsumura et al. .............. 345/87

FOREIGN PATENT DOCUMENTS

| JP | 2-242228    | 9/1990  |
|----|-------------|---------|
| JP | 07-104246   | 4/1995  |
| JP | 11-183937   | 7/1999  |
| JP | 11-183937 A | 7/1999  |
| JP | 11-271788   | 10/1999 |

(Continued)

OTHER PUBLICATIONS

Saito et al, "Thermodynamics of a Unique Thermo-Tropic Liquid Crystal Having Optical Isotropy", Ekisho, 2001, vol. 5, No. 1, pp. 20-27.
Yamamoto, "Liquid Crystal Micro Emulsion", Ekisho, 2000, vol. 4, No. 3, pp. 248-254.
Kobunshi Ronbunshu, Dec. 2002, vol. 59, No. 12, pp. 753-759.
Yoneya, "Examining Nano-Structured Liquid Crystal Phase by Molecule Simulator", Ekisho, 2003, vol. 7, No. 3, pp. 238-245.

(Continued)

*Primary Examiner*—Andrew Schechter
*Assistant Examiner*—Michael P Mooney
(74) *Attorney, Agent, or Firm*—Nixon & Vanderhye P.C.

(57) ABSTRACT

A plurality of display elements each includes two signal lines: S1 and S2. An electrode 4, which is one of the electrodes constituting an element capacitor Cp, is connected to the signal line S1 via a switching element TFT1, while the other electrode 5 is connected to the signal line S2 via a switching element S2. The gate electrodes of the switching elements TFT1 and TFT2 are connected to a single common scanning line G. With this structure the drive voltage applied to the element capacitor can be increased even when a TFT has a limited withstand pressure.

22 Claims, 21 Drawing Sheets

FOREIGN PATENT DOCUMENTS

| | | |
|---|---|---|
| JP | 2000-338462 | 12/2000 |
| JP | 2001-133808 | 5/2001 |
| JP | 2001-249363 | 9/2001 |
| JP | 2001-249363 A | 9/2001 |
| JP | 2003-091014 | 3/2003 |
| JP | 2003-131636 | 5/2003 |

OTHER PUBLICATIONS

Handbook of Liquid Crystals, Wiley-VCH, 1998, vol. 1, pp. 484-485 and p. 530.

Demus et al, "Chapter XIII Thermotropic Cubic Phases", Handbook of Liquid Crystals Low Molecular Weight Liquid Crystal, Wiley-VCH, 1998, vol. 1.2B, pp. 887-900.

Yamamoto, "First Lecture of Liquid Crystal Science Experiment: Identification of Liquid Crystal Phase" Lyotropic Liquid Crystal, Ekisho, 2002, vol. 6, No. 1, pp. 72-82.

Grelet et al, "Structural Investigations on Smectic Blue Phases", Physical Review Letters, Apr. 23, 2001, vol. 86, No. 17, pp. 3791-3794.

Matsumoto et al, "Fine Droplets of Liquid Crystals in a Transparent Polymer and Their Response to an Electric Field", Appl. Phys. Lett., 1996, vol. 69, pp. 1044.

Mizoshita et al, "Fast and High-Contrast Electro-Optical Switching of Liquid-Crystalline Physical Gels: Formation of Oriented Microphase-Separated Structures", Adv. Funct. Mater., 2003, vol. 13, No. 4, pp. 313-317.

\* cited by examiner

NO VOLTAGE APPLICATION
(OFF-STATE)

VOLTAGE IS APPLIED
(ON-STATE)

FIG. 4 (a) NO VOLTAGE APPLICATION

FIG. 4 (b) VOLTAGE IS APPLIED

SUBSTRATE 1
(WITH SIGNAL LINE S)

SUBSTRATE 2
(WITH COUNTER
ELECTRODE LINE C)

SUBSTRATE 1
(WITH SIGNAL LINE C)

(THE BROKEN LINE INDICATES
OUTER DIMENSION OF
COUNTER ELECTRODE 5)

DISPLAY DEVICE

This application is the U.S. national phase of international application PCT/JP2004/018930 filed 17 Dec. 2004, which designated the U.S. and claims benefit of JP 2003-420967 filed 18 Dec. 2003, the entire contents of each of which are hereby incorporated by reference.

TECHNICAL FIELD

The present invention relates to a display device driven by a high-voltage.

BACKGROUND ART

A liquid crystal display element has advantages over other display element in terms of thinness, lightness in weight, and small power consumption. With the advantages the liquid crystal display element is widely used for image display devices such as a television and a monitor, and image display devices provided on OA (Office Automation) equipments, such as a word processor or a personal computer, or on information terminals such as a video camera, a digital camera, a mobile phone etc.

There are conventionally well-known liquid crystal display modes for the liquid crystal display element, such as the TN (twisted Nematic) mode using Nematic liquid crystal, the display mode using FLC (ferroelectric liquid crystal) or AFLC (anti-ferroelectric liquid crystal), and the polymer dispersed liquid crystal display mode. Another well-known mode is a IPS (In-Plane Switching) mode (horizontal electric field drive mode) which uses an electric field parallel to the substrate plane.

These liquid crystal display elements more quickly respond when driven by a high-voltage. Particularly, the liquid crystal display elements in the IPS mode tend to be driven by a high voltage not only for quick response but also for a larger aperture.

However, a general conventional liquid crystal display device uses a TFT (switching element) structure (circuit layout having a TFT), which is not suitable for high-voltage driving.

Here, the following explains a reason why the circuit layout of the conventional liquid crystal display device is not suitable for high-voltage driving. FIG. 17 is a cross sectional view showing a schematic structure of a display element 100 of a conventional IPS liquid crystal display device. As shown in the figure, the liquid crystal display element 100 are made of (i) two glass substrates (substrate 101 and substrate 102) and (i) liquid crystal (not shown). The liquid crystal is sealed in a dielectric material layer 103 between the two glass substrates. Further, on one of the surfaces of the substrates 101 facing the substrate 102, a signal electrode 104 and a counter electrode 105 are provided, facing one another, for applying a voltage between the dielectric material layers 103. Polarizers 106 and 107 are formed on the substrates 101 and 102, respectively, on their outward surfaces. To display an image, this liquid crystal display device applies a voltage between the two electrodes so that the generated electric field changes the orientations of their liquid crystal molecules.

FIG. 18 is a pixel equivalent circuit diagram illustrating a switching TFT provided in the foregoing liquid crystal display device. FIG. 19 is a schematic view showing a structure of a pixel of the display element 100. As shown in these figures, in the liquid crystal display device, the signal electrode 104 and the counter electrode 105 constitute an element capacitor Cp, and the signal electrode 104 is connected to a signal line S via the switching element TFT, and the counter electrode 105 is connected to a counter electrode line C. Further, the gate electrode of the switching element TFT is connected to the scanning line G. As shown in FIG. 19, the axes of the polarizers 106 and 107 respectively provided on the two substrates 101 and 102 are orthogonal to each other, and each form an about 45° angle with a direction in which the electrodes 104 and 105 are opposed (direction of electric field).

In this conventional liquid crystal display element, if assuming that the voltage applied to the counter electrode line C is expressed as DC (direct, constant), and the dynamic range of the acceptable voltage for the signal line S is expressed by Vpp, a voltage of ±Vpp/2 is applied to the display element 100 (element capacitor (element) Cp) if the display element 100 is stably driven by an alternating current. More specifically, when a voltage ranging from Vpp to Vpp/2 is applied to the signal line S while applying a constant voltage (Vpp/2) to the counter signal line C, a voltage of Vpp/2–0(=voltage of the signal line S–voltage of the counter electrode line C) is applied to the display element 100. Meanwhile, when a voltage ranging from Vpp/2 to 0 is applied to the signal line S, a voltage of 0–Vpp/2 is applied to the display element 100.

In such a liquid crystal display device, the drive voltage, i.e., the voltage applied to the display element 100, may be increased by applying an AC (alternating current) to the counter electrode line C, by, for example, changing the voltage applied to the counter electrode 105 (counter electrode line C) into an alternating current ranging from 0 to Vpp. In this case, if assuming that the voltage applied to the signal line S ranges from Vpp to 0, and the voltage applied to the counter electrode line C is 0, a voltage of Vpp–0 is applied to the display element 100. Meanwhile, if assuming that the voltage applied to the signal line S is Vpp–0, and the voltage applied to the counter electrode line C is Vpp, a voltage ranging from 0 to –Vpp is applied to the display element 100. In other words, by applying an alternating current ranging from 0 to –Vpp to the counter electrode line C, a voltage of 0–±Vpp is applied to the display element 100. The voltage applied to the display element 100 is thus doubled.

Note that, even when an AC is applied to the counter electrode line C, the drive voltage may not be sufficient. In this case, it is necessary to increase the dynamic range Vpp of the voltage applied from the signal line S. That is, in this case, the voltage applied to the display element 100 is increased by both application of alternating current to the counter electrode 15 and an increase in dynamic range Vpp of the voltage applied to the signal line S.

However, in this case, a great voltage is applied to the scanning line G, which decreases durability of the switching element TFT. The following explains this problem with reference to FIGS. 20 and 21. FIG. 20 is an equivalent circuit diagram of the conventional liquid crystal display device, showing two adjacent pixels (pixel 11 and pixel 12) connected to different scanning lines G. FIG. 21 is a timing chart showing an example of respective voltages of various sections in the pixels 11 and 12.

In FIG. 20, the pixel (display element) 11 and the pixel (display element) 12 having the structure of display element 100 shown in FIG. 18 are adjacently placed. In each of the element capacitor Cp of the pixels 11 and 12, one of the electrodes is connected to a common signal line S via the switching element TFT, while the other is connected to a common counter electrode line C.

In the structure of FIG. 21, when the switching element TFT of the pixel 11 is turned on under condition that the potential of counter electrode 105 (potential of counter electrode line C) is 0, and the signal voltage (voltage being applied to the signal line S) is Vpp, the potential of the drain D becomes Vpp, which is written into the pixel. Even if the switching element TFT is thereafter turned off, the potential difference between the drain D and the counter electrode line C (corresponding electrode) is kept at Vpp unless an opposite polarity is written to the pixel 12. In other words, the difference is maintained so long as the potential of the counter electrode line C is kept at 0.

However, when a opposite polarity is written to the pixel 12 which is adjacent to the pixel 11; in other words, when the switching element TFT is turned on under condition that the potential of counter electrode (potential of counter electrode line C) is Vpp, and the signal voltage is 0, the potential of the drain D of the pixel 11 becomes 2 Vpp. This is because the pixel 11 and the pixel 12 use the common counter electrode line C, and the potential difference between the two terminals of the element capacitor (pixel capacitor) is constant.

More specifically, when the potential of the counter electrode line C becomes Vpp so as to carry out writing to the pixel 12, the potential of one of the terminals (the one close to the counter electrode line C) of the element capacitor of the pixel 11 becomes Vpp since the pixel 11 and the pixel 12 use the common counter electrode line C (i.e., their counter electrode line C are unified). On the other hand, because the switching element of the pixel 11 is off, the accumulated charge is held in the element capacitor Cp, thereby making the potential difference between the two terminals of the element capacitor Cp constant. On this account, a change in potential of the terminal (the one close to the counter electrode line C) causes the same amount of change in potential of the terminal of the drain D.

Note that, as shown in FIG. 21, when the potential of the counter electrode line C becomes 0 so as to carry out writing of Vpp into the next pixel during when the switching element TFT is turned off after 0 is written to the pixel 12, the potential of the drain D of the pixel 12 decreases to −Vpp.

As described, in the circuit of the conventional liquid crystal display device, the potential of drain D greatly varies (to 2 Vpp or −Vpp in the foregoing example) from the writing potential (Vpp or 0 in the foregoing example).

Note that, to ensure accurate driving of all pixels, the switching element needs to be precisely turned on or off even in the presence of variation of drain potential (potential of the drain D). Accordingly, it is necessary to increase the difference between the voltage for turning on the switching element TFT (gate-on voltage) and the voltage for turning off the switching element TFT (gate-off voltage) by the same amount as that of variation of the drain potential.

However, an increase of potential applied to the scanning line G causes a great decrease of duration of the switching element TFT. Therefore, a significant damage is given to the switching element TFT particularly when the dynamic range Vpp of the voltage supplied to the signal line S is increased.

The drive voltage for the liquid crystal layer of the conventional liquid crystal display device is thus limited by the pressure resistance of the switching element TFT (thin film transistor). This limitation is particularly significant in a recently-developed polysilicon panel (e.g. monolithic polysilicon panel on which the pixels and the driving circuit are formed at once) which includes polysilicon TFTs as the switching elements. That is, the pressure resistance of the polysilicon TFT is generally low and therefore it is necessary to set a low upper limit of the drive voltage.

Such a circumstance raises a demand of a technique for ensuring large voltage application (drive voltage, electric field) to the liquid crystal in the liquid crystal display element (liquid crystal panel) using a switching element which is constituted of a TFT limited in durability.

A TN-mode liquid crystal display device, which is one of the various conventional liquid crystal display devices, has several defects, such as slow response, narrow viewing angle etc. to obtain a certain advantage over a CRT (cathode ray tube).

Further, tough the display mode using FLC or AFLC ensures quick response and wide viewing angle, it has serious defects in terms of shock-resistance, temperature characteristic etc., which keeps it from a wider application.

Further, the polymer dispersed liquid crystal display mode using light scattering does not require a polarizer, and is capable of high luminance display; however, this display mode is substantially incapable of viewing angle adjustment by a phase plate, and also has a defect in terms of response characteristic. The polymer dispersed liquid crystal display mode is therefore not considered significantly superior than the TN mode. In all of these display modes, liquid crystal molecules are aligned in a certain direction, and the vision differs depending on the viewing angle with respect to the liquid crystal molecules. That is, the effective viewing angle is restricted. Further, these display modes carry out display by causing the liquid crystal molecules to be rotated by way of electric field application, in this way the liquid crystal molecules are rotated while keeping the alignment state and therefore the response is slow. The display mode using FLC or AFLC has a certain advantage in terms of response speed, and viewing angle, but has a problem of nonreversible alignment destruction due to an external force.

Apart from the display elements using the molecule rotation due to the application of the electric field, an electronic polarization display mode using the electro-optic effect proportional to square of the electric field is proposed.

The term "electro-optic effect" indicates such a phenomenon that reflective index of a substance varies according to an outer electric field, and there are two types in the electro-optic effect: (i) the Pockels effect that is proportional to the electric field, and (ii) the Kerr effect that is proportional to square of the electric field. The Kerr effect, that is the Kerr electro-optic effect, was adopted early on in high-speed optical shutters, and has been practically used in special measuring instruments.

The Kerr effect was found by J. Kerr in 1875. Well-know materials showing the Kerr effect are organic liquid materials such as nitrobenzene, carbon disulfide, and the like. These materials are used for, for example, the aforementioned optical shutter, an optical modulating device, an optical polarizing device. For example, these materials are used, e.g., for measuring the strength of high electric field for power cables and the like, and similar uses.

Later on, Research has been conducted to utilize a large Kerr constant of the liquid crystal materials for use in light modulation devices, light deflection devices, and optical integrated circuits. It has been reported that a liquid crystal compound has a Kerr constant more than 200 times higher than that of nitrobenzene.

Under these circumstances, studies for using the Kerr effect to a display device have begun. It is expected that use of the Kerr effect attains a relatively low voltage driving than the Pockels effect that is proportional to electric field, because the Kerr effect is proportional to the square of the electric field. Further, it is expected that the utilization of the Kerr effect attains a high-response display apparatus because, e.g., the Kerr effect shows a response property of several p (micro) seconds to several m (milli) seconds, as its basic nature.

For example, disclosed by Tokukai 2001-249363 is a display device, as a display device using the Kerr effect, which includes: (i) a pair of substrates, at least one substrate of the substrates being transparent; (ii) a medium that is provided between the substrates, and that contains polar molecules in an isotropic phase state; (iii) a polarizing plate provided on an outer side of the at least one substrate; and (iv) electric field applying means for applying an electric field to the medium. However, the display device disclosed in the foregoing publication needs to be driven by a high drive voltage. Therefore, this display device cannot be driven by a TFT (thin film transistor, switching element) structure (circuit structure including TFT) of a conventional liquid crystal display device. More specifically, to drive a display device using the Kerr effect disclosed in the foregoing patent publication, a circuit suitable for high voltage driving is required, and the circuit also needs to be compatible with a TFT of a conventional liquid crystal display device.

The present invention is made in view of the foregoing conventional problem, and the object is to provide a display device which can be driven by a high voltage even with a switching element constituted of a TFT limited in durability.

DISCLOSURE OF INVENTION

In order to solve the foregoing problems, a display device according to the present invention comprises (i) a pair of substrates, at least one of which is transparent, (ii) a medium provided between the substrates, and (iii) a display element including a first electrode and a second electrode for applying an electric field to the medium so as to carry out a display, the first electrode and the second electrode being connected to separate switching elements.

With the foregoing arrangement, the first and the second electrodes are disconnected from all electrode lines if the switching elements to which the first and the second electrodes are connected are turned off. Therefore, during the writing of an inversed polarity into another electrode connected to another scanning line, the potential difference between the first and the second electrodes is kept at a constant level. Accordingly, the voltage for driving the switching elements can be reduced, and durability of the switching elements increases.

Further, for example, even when a large voltage is applied to the first and the second electrodes so as to increase the drive voltage, the durability of the switching elements will not be decreased. More specifically, even in high voltage driving, the decrease in durability of the switching element is avoided. That is, even with a switching element limited in durability, the drive voltage can be increased.

The display device according to the present invention may be arranged so that the display device includes a plurality of the display elements, each of which includes a first signal line and a second signal line, and the first electrode and the second electrode being connected to separate signal lines via separate switching elements.

With the foregoing arrangement, the switching elements connected to the two electrodes are both turned on to apply a signal voltage between the electrodes, and the switching elements connected to the two electrodes are both turned off to stop signal voltage application between the electrodes. Therefore, the tendency of voltage fluctuation due to parasitic capacitor becomes similar in the two electrodes. Therefore, the voltage shifts having the similar tendencies tend to be balanced off. The problem of voltage shift in the two electrodes thus becomes less significant.

The display device according to the present invention may be arranged so that the display device includes (i) a plurality of the display elements; (ii) a plurality of signal lines corresponding to the display elements; and (iii) a common counter electrode line to be shared by all of the display elements, the first electrode is connected to the signal line via a switching element, and the second electrode is connected to the common counter electrode line via a switching element other than the switching element to which the first electrode is connected.

The display device according to the present embodiment does not need two signal lines for each of the display elements (pixels). In other words, it does not require a larger number of signal lines. On this account, the structure is simplified, resulting in an increase in yield in the manufacturing of the display device.

In the display device according to the present invention, a refractive index of the medium may change in proportion to square of the electric field. Further, the medium may contain a liquid crystal material. Further, the medium may contain polar molecules.

Further, a degree of optical anisotropy in the medium may change in response to application of electric field. The change in degree of optical anisotropy here means a change in shape of refractive index ellipsoid. More specifically, in the display element of the present invention, the display condition may be switched by using a change in shape of refractive index ellipsoid in response to application of electric field.

On the contrary, in the conventional liquid crystal display element, the shape of the refractive index ellipsoid stays elliptic irrespective of the electric field application, but a direction of a longitudinal side of the refractive index ellipsoid is changed (rotates). In other words, the conventional liquid crystal display element exhibit two different display states by using the change (rotation) of the longitudinal side of the refractive index ellipsoid depending on presence/absence of an electric field.

Note that, because the conventional liquid crystal display element uses a change in an alignment direction of liquid crystal molecules, the response speed of the conventional liquid crystal display element is greatly influenced by intrinsic viscosity of liquid crystal. On the contrary, the aforementioned arrangement uses the change in the magnitude of the optical anisotropy in the medium so as to carry out displaying. For this reason, the response speed is not greatly influenced by the intrinsic viscosity of the liquid crystal unlike the conventional display element. Therefore, the arrangement allows realization of high-speed response. Further, the high-speed responsiveness of the present display element can be used for a field sequential color display device.

Further, the conventional liquid crystal display element using the electro-optic effect raises such a problem that: the driving temperature range is limited to a vicinity of a phase transition point of the liquid crystal, and therefore requires very precise temperature control. On the contrary, the arrangement allows an easy temperature control by only keeping the medium at such a temperature that the magnitude of the optical anisotropy can be varied according to electric field application.

Further, since the foregoing display element carries out display by using a change in degree of optical anisotropy of the medium, the display element achieves a wide viewing angle characteristic, that cannot be obtained by the display device according to the conventional method that performs display by changing alignment direction of the liquid crystal molecules.

In the foregoing display element, the medium may have such a characteristic that it exhibits optical isotropy in the absence of the electric field, and exhibits optical anisotropy in the presence of the electric field. In this case, when a voltage is applied, the shape of the refractive index ellipsoid is elliptic, and when no electric field is applied, the shape thereof becomes globular. Further, the medium may have such a characteristic that it exhibits optical anisotropy in the absence of the electric field, and exhibits optical isotropy in the presence of the electric field. In this case, when no electric field is applied, the shape of the refractive index ellipsoid is elliptic, and when an electric field is applied, the elliptic shape is turned into a globe.

The display device according to the present invention may be arranged so that the medium is constituted of molecules having an orderly structure smaller than an optical wavelength either in the presence or in the absence of electric field. More specifically, instead of an isotropic liquid phase, the medium may have an order (orderly structure, alignment order). If the orderly structure is smaller than optical wavelength, it exhibits isotropy. Accordingly, by using a medium whose orderly structure becomes smaller than optical wavelength in the presence or absence of electric field, it is possible to ensure the change in display state depending on whether an electric field is applied.

Further, the foregoing medium, which changes in degree of optical anisotropy in response to application of electric field, may have an orderly structure exhibiting a cubic symmetry, or may be a medium constituted of molecules that exhibit a cubic phase or a smectic D phase, or may be a medium made of a liquid crystal micro emulsion, or may be a medium made of a lyotropic liquid crystal that exhibits a micelle phase, a reverse micelle phase, a sponge phase or a cubic phase. A medium of a liquid crystal fine particle dispersed system that exhibits a micelle phase, a reverse micelle phase, a sponge phase or a cubic phase, a medium made of a dendrimer, a medium constituted of molecules that exhibit a cholesteric blue phase, or a medium constituted of molecules that exhibit a smectic blue phase may also be adopted.

With the use of one of the mediums, the display state may be switched depending on whether the electric field is applied.

The medium in which a pitch (hereinafter, referred to as "helical pitch") of molecules disposed in a helical manner is more than 400 nm possibly changes a color into a color reflecting the pitch. In other words, in the case where the helical pitch of the molecules in the medium is more than 400 nm, light having a wavelength reflecting the helical pitch is selectively reflected, thereby possibly causing the color change of the display color of the display element into the color reflecting the pitch. The phenomenon of selectively reflecting the light having the wavelength reflecting the helical pitch as such is referred to as "selective reflection."

The color change can be prevented by setting the helical pitch or selective reflection wavelength region in the medium at 400 nm or less. Specifically, because light having a wavelength of not more than 400 nm almost cannot be recognized by human's eyes, such a color change does not raise a problem.

The wavelength of the light to be selectively reflected also depends on an incident angle with respect to a helical axis that the medium has. Therefore, in case where the orderly structure that the medium has is not in one dimension but is in, for example, three dimension, the incident angle with respect to the helical axis has a distribution. This causes a distribution in a wavelength range of the light to be selectively reflected.

Therefore, it is preferable that the entire selective reflection wavelength region be 400 nm or less.

Further, it is more preferable that the selective reflection wavelength region or helical pitch in the medium be 380 nm or less. This is because the CIE (Commission Internationale de l'Elairage) provides that light having a wavelength of not more than 380 nm cannot be recognized by human's eyes. Therefore, in the case where the selective reflection wavelength region or helical pitch in the medium is 380 nm or less, the color change can be securely prevented.

Further, it is further preferable that the helical pitch in the medium be 253 nm or less. The color change is also associated with an average refractive index of the dielectric medium, in addition to the helical pitch and the incident angle. The light having a color to be changed is light having a wavelength that falls within a wavelength range of: $\Delta\lambda=P\Delta n$ centering on a wavelength of: $\lambda=nP$. Here, indicated by n is the average refractive index, and indicated by P is the helical pitch, and indicated by $\Delta n$ is anisotropy of refractive index.

$\Delta n$ varies depending on dielectric materials. For example, in case where a liquid crystal material is used for the material that is to be interposed as the dielectric material layer, the liquid crystal material has the average refractive index n of 1.5, and has $\Delta n$ of approximately 0.1. In this case, the wavelength $\lambda$ is set at 400 nm, and the helical pitch P for bringing the color, which is to be changed, out of the visible range is found by the following equation: 400/1.5=267 nm. Further, $\Delta\lambda$ is found by: 0.1×267=26.7 nm. Therefore, by setting the helical pitch at 253 nm (found by subtracting 13.4 nm (the half of 26.7 nm) from 267 nm) or less, it is possible to prevent such a color change.

Further, it is further preferable that the helical pitch in the medium be 240 nm or less. In the above case, the wavelength $\lambda$ in the relation of: $\lambda=nP$ is set at 400 nm that is the wavelength that almost cannot be recognized by human's eyes. In case of setting the wavelength $\lambda$ at 380 nm that is the wavelength that surely cannot be recognized human's eyes, the helical pitch for preventing the color change is 240 nm or less that is found in consideration for the average refractive index of the dielectric medium. Therefore, by setting the helical pitch in the medium at 240 nm or less, the color change can be securely prevented.

The display device according to the present invention may further comprise an auxiliary capacitor connected in parallel to the first and second electrodes, or may further comprise a first auxiliary capacitor in which one electrode is connected to the first electrode; a second auxiliary capacitor in which one electrode is connected to the second electrode; and an auxiliary capacitor wire connected to the other electrode of the first auxiliary capacitor and the other electrode of the second auxiliary capacitor.

In these structures with auxiliary capacitors, the leak current is less affected to the switching element.

In the display device according to the present invention, the first and second electrodes may generate an electric field along a direction parallel to surfaces of the substrates.

A general horizontal-electric-field-driving display device in which a voltage is applied along a direction parallel to surfaces of the substrates tends to be driven by a high voltage in terms of increase in aperture ratio or response speed. For such a horizontal-electric-field display device, the foregoing structure allows the device to be driven by a high voltage even with the limited withstand pressure.

The foregoing structure in which the first electrode and the second electrode are formed on the same substrate with their separate switching elements has the following advantages over (i) the conventional horizontal-electric-field-driving display device which has only one switching element for each pixel or (ii) the vertical-electric-field-driving display device in which an electric field is applied between two substrate (between two electrodes on the two substrates) which both have switching elements so that their electrodes are connected to separate switching elements.

(a) It can be produced by a manufacturing process substantially the same as that of a conventional horizontal-electric-field-driving display device (TFT substrate manufacturing process), and therefore the manufacturing cost does not significantly increases. The vertical-electric-field-driving display device requires formation of two TFTs (switching element) for both of the substrates, and the manufacturing cost greatly increases.

(b) The driver (source (signal) driver, gate driver) may be connected to only one of the substrates as with the conventional horizontal-electric-field-driving display device. The vertical-electric-field-driving display device requires the both of the two substrates to be connected to the separate drivers, and the panel structure becomes complicated.

(c) The color filter may be formed on a different substrate from the substrate having a TFT. On the other hand, in the vertical-electric-field-driving display device in which a TFT is formed for each of the two substrates, the color filter is always formed on the substrate having the TFT, which raises a problem of decrease in yield, increase in manufacturing cost, or decrease in reliability of panel.

(d) The TFT is oriented to the same direction as that of the TFT of the conventional horizontal-electric-field-driving display device, and therefore the backlight will not generate a photocurrent. On the other hand, in the vertical-electric-field-driving display device, the channel of TFT on one of the substrates faces directly to the backlight, and a photocurrent may be generated.

(e) A single common gate is used for the TFTs, and therefore the number of gate drivers does not increase. On the other hand, the vertical-electric-field-driving display device in which a gate line is provided for each of the TFTs on the two substrates needs a larger (double) number of gate drivers. Further, it also requires a larger (double) number of source drivers.

(f) Only one of the substrates need a TFT, and therefore the device may adopts a monolithic structure (e.g. low-temperature polysilicon monolithic panel) in which the pixels and the driving circuit are formed on a single substrate. More specifically, the foregoing structure is suitable for the monolithic structure. The vertical-electric-field-driving display device may adopt a monolithic structure, but there is a risk for great decrease in yield. The yield of monolithic structure is generally low in the first place, but it is doubled in the vertical-electric-field-driving display device in which two monolithic substrates are combined.

The display device according to the present invention is not dedicatedly used for a horizontal-electric-field-driving display device, but may also be used for a vertical-electric-field-driving display device. However, in this case, it is preferable that the display device include (i) a plurality of the display elements; (ii) a plurality of signal lines corresponding to the display elements; and (iii) a common counter electrode line to be shared by all of the display elements, the first electrode is connected to the signal line via a switching element, and the second electrode is connected to the common counter electrode line via a switching element other than the switching element to which the first electrode is connected.

In this structure, the TFTs on one of the substrates are connected to the single common counter electrode line C. Therefore, in this substrate, it is not necessary to establish connection between the signal line and individual switching elements TFT which respectively correspond to the plural pixels. On this account, the yield increases. As another advantage, said substrate may be disconnected to the source driver.

Additional objects, features, and strengths of the present invention will be made clear by the description below. Further, the advantages of the present invention will be evident from the following explanation in reference to the drawings.

BRIEF DESCRIPTION OF DRAWINGS

FIG. 23(*b*) is a schematic wiring view of another substrate in the display device of FIG. 22.

FIG. 23(*c*) is a schematic wiring view showing relative positions of two electrodes in the display device of FIG. 22. The figure is viewed from one of the substrates.

BEST MODE FOR CARRYING OUT THE INVENTION

The following will explain one embodiment of the present invention with reference to Figures.

First Embodiment

Example 1

Figure 2:
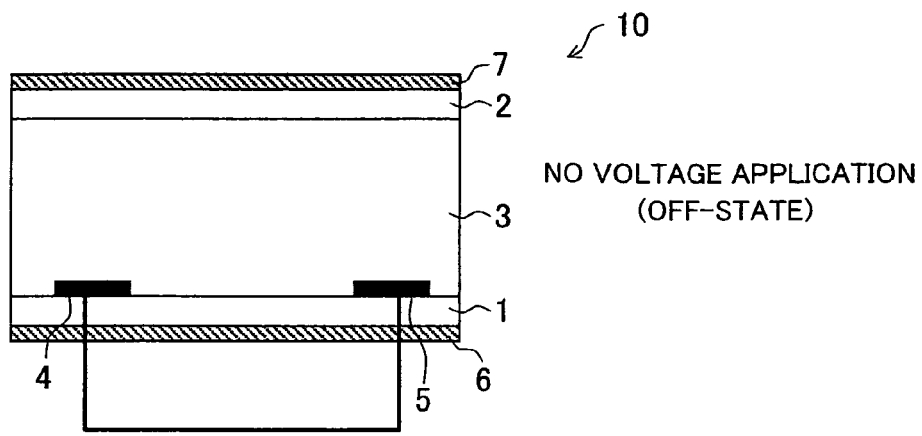
FIG. 2(a) is a cross sectional view illustrating a display element in a display device according to one embodiment of the present invention under no voltage (electric field) application.
FIG. 2(b) is a cross sectional view illustrating a display element in a display device according to one embodiment of the present invention under voltage (electric field) application.
Figure 2:
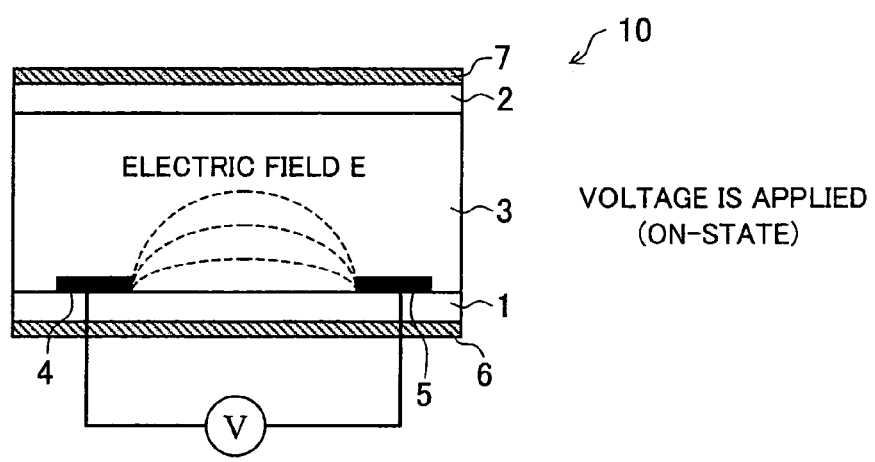

The following explains one embodiment of the present invention in reference to the figures. FIGS. 2(*a*) and 2(*b*) are cross sectional views each schematically illustrating a structure of display element (pixel) 10 in a display device according to the present embodiment (the present display device). The present display device includes a plurality of the display elements 10 in addition to a drive circuit, signal lines (data signal lines), or scanning lines (scanning signal lines). In other words, the display device includes a plurality of data signal lines, and a plurality of scanning signal lines which intersect with the data signal lines. Provided in each intersection of data signal line and scanning signal line is a pixel having the display element 10.

The display element 10 is structured such that a dielectric material layer 3 (optical modulation layer) is sandwiched between two opposed substrates (substrates 1 and 2). Two opposed pectination electrodes (pectination electrodes) 4 and 5 are provided on that surface of the substrate 1 which faces to the substrate 2. The pectination electrodes 4 (signal electrode) and 5 (counter electrode) are provided as electric field application means which applies an electric field to the dielectric material layer 3. Furthermore, polarizing plates 6 and 7 are respectively provided on the rear surfaces of the substrates 1 and 2, which are on the other side of the surfaces facing to each other.

Note that, FIG. 2(*a*) illustrates a state in which no voltage (electric field) is applied between the pectination electrodes 4 and 5 (no voltage (electric field) application state (OFF state)). FIG. 2(*b*) illustrates a state in which a voltage (electric field) is applied between the pectination electrodes 4 and 5 (voltage (electric field) application state (ON state)). The substrates 1 and 2 are glass substrates. Note that, materials of the substrates 1 and 2 are not limited to this as long as at least one of the substrates 1 and 2 is transparent. The interval between the substrates in the present display element, that is, a thickness of the dielectric material layer 3 is 10 μm. However, the interval between the substrates is not limited in the preset invention, but may be determined arbitrarily.

Figure 3:
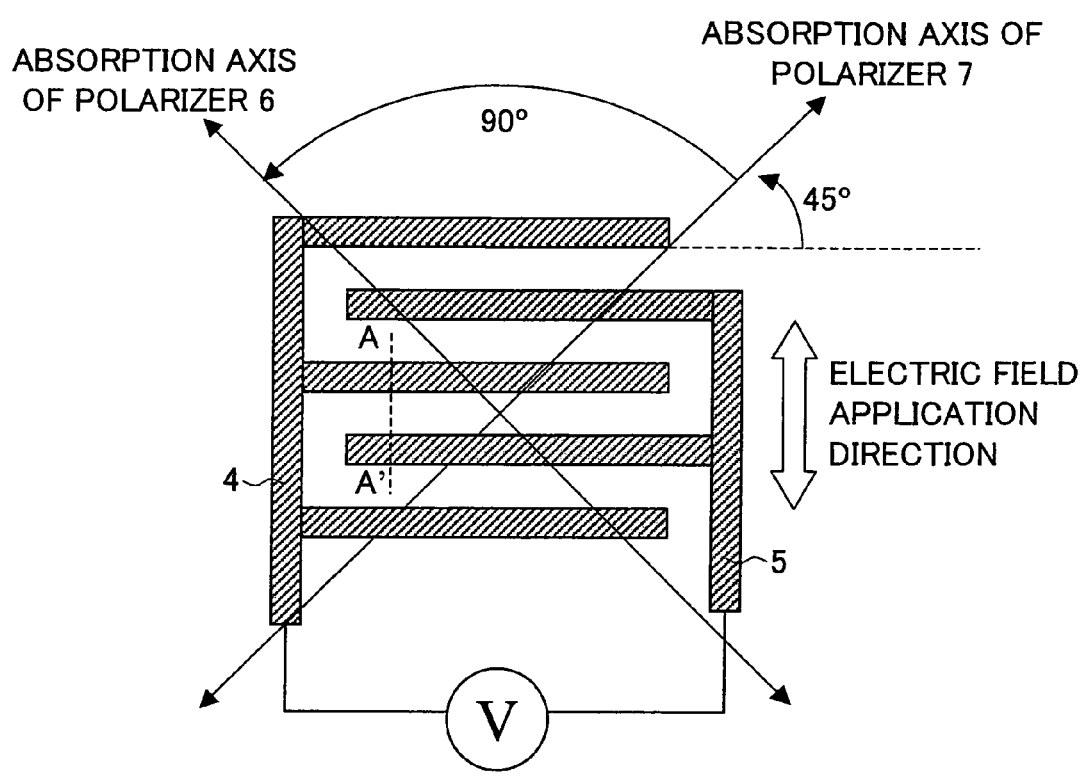
FIG. 3 is an explanatory view showing positions of an electrode and a polarizer of a display element provided in a display device according to one embodiment of the present invention.

FIG. 3 is an explanatory view illustrating positions of the pectination electrodes 4 and 5 and directions of absorption axes of the polarizing plates 6 and 7. As illustrated in FIG. 3, the pectination electrodes, which are formed like combs, are provided face to face. Note that, each of the pectination electrodes 4 and 5 has a line width of 5 μm, and a distance between the electrodes (electrode interval) is 5 μm. However, the present invention is not limited to this. For example, it is possible to set these values arbitrarily according to a gap between the substrate 1 and the substrate 2. Moreover, as materials of the pectination electrodes 4 and 5, it is possible to use various materials which are conventionally well-known, such as transparent electrode materials (ITO (indium tin oxide), etc), metal electrode materials (aluminum, etc), or the like. Also, the electrodes 4 and 5 may have different shapes.

As illustrated in FIG. 3, the polarizing plates 6 and 7 respectively provided on the substrates 1 and 2 are arranged such that respective absorption axes are orthogonal with each other, and absorption axes of the polarizing plates are at an angle of about 45° with respect to directions to which the teeth portions of the pectination electrodes 4 and 5 extend. On this account, the absorption axis of each of the polarizing plates is at an angle of about 45° with respect to an electric field application direction.

A compound (hereinafter referred to as compound A) having the following structural formula (1) is sealed in the dielectric material layer 3.

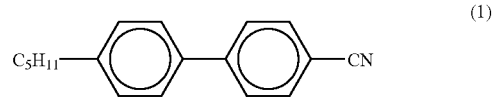

(1)

The compound A exhibits a Nematic phase under a temperature less than 33.3° C. When the temperature becomes 33.3° C. or greater, the molecules of the compound A become equant, thereby exhibiting isotropy.

Further, the present display device includes heating means (not shown) which keeps the dielectric material layer 3 at a temperature slightly higher than a predetermined temperature, which is the phase transition temperature from Nematic phase into isotropic phase (liquid crystal phase—isotropic phase transition temperature). The heating means may be realized by a heater provided in the vicinity of the display device 10, or may be a sheet heater attached directly to the display element 10.

Further, if necessary, alignment films having been through rubbing treatment may be respectively formed on the counter surfaces (the surfaces facing to each other) of the substrates 1 and 2. In this case, the alignment film formed on the substrate 1 may be formed so as to cover the pectination electrodes 4 and 5.

Figure 4:
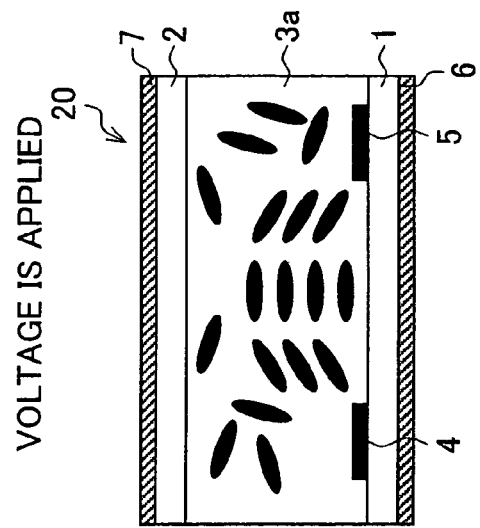
FIG. 4(a) is a cross sectional view illustrating a display element in a display device according to one embodiment of the present invention under no voltage (electric field) application.
FIG. 4(b) is a cross sectional view illustrating a display element in a display device according to one embodiment of the present invention under voltage (electric field) application.
FIG. 4(c) is a graph illustrating a voltage-transmittance curve in a display device according to one embodiment of the present invention.
Figure 4:
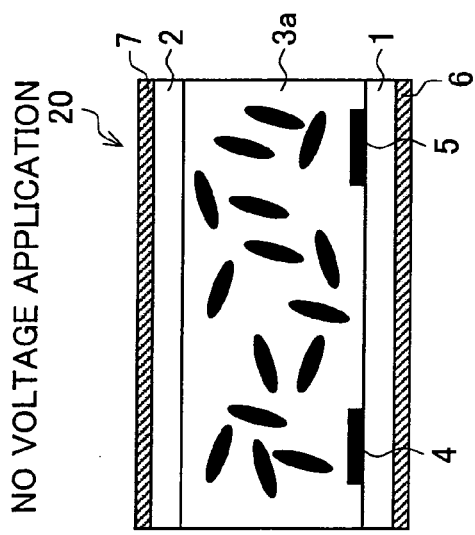
Figure 4:
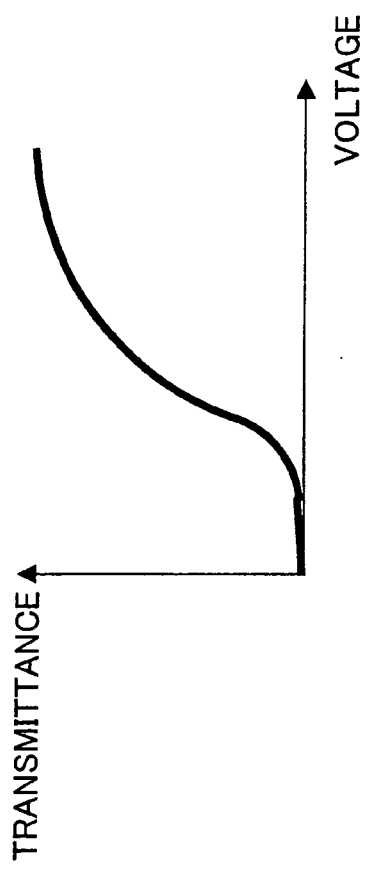

FIG. 4(*a*) is an explanatory view illustrating an alignment state of liquid crystal molecules when the dielectric material layer 3 is kept at a temperature slightly higher than the phase transition temperature from Nematic phase into isotropic phase under no voltage (electric field) application between the electrodes 4 and 5. FIG. 4(*b*) is an explanatory view illustrating an alignment state of liquid crystal molecules when the dielectric material layer 3 is kept at a temperature slightly higher than the phase transition temperature from Nematic phase into isotropic phase (liquid crystal phase—isotropic phase transition temperature) in the presence of voltage (electric field) between the electrodes 4 and 5.

As shown in the figures, the present display device is capable of changing the transmittance by keeping the dielectric layer 3 at a temperature slightly above the Nematic phase/isotropic phase transition temperature (a temperature slightly higher than the phase transition temperature; typically in a range of about +0.1K) at the time of voltage application. Therefore, as shown in FIG. 4(*a*), when no electric field is applied between the electrodes 4 and 5, the dielectric material layer 3 made of the compound A is in the isotropic phase, and is also optically isotropic. Therefore, the display device carries out black display at that time. Meanwhile, as shown in FIG. 4(*b*), the longitudinal axis direction of the molecules of the compound A are oriented to the electric field direction in the region subjected to electric field application, expressing birefringence. Therefore, the transmittance is modulated.

FIG. 4(*c*) is a graph showing a curve of voltage transmittance of the present display device illustrating an alignment state of liquid crystal molecules when the dielectric material layer 3 is kept at a temperature slightly higher than the phase transition temperature from Nematic phase into isotropic phase in the presence of voltage (electric field) between the electrodes 4 and 5. The graph shows respective transmittance for different voltage levels. As shown in the figure, the present display device is capable of changing the transmittance depending on the applied voltage level.

Note that, when the dielectric material layer 3 is kept at a temperature slightly higher than the phase transition temperature, the transmittance can be modulated to a practically sufficient extent, that is, a voltage level of about 0V to 100V. However, at a temperature very far from a phase transition temperature (a temperature greatly higher than the phase transition temperature), a high voltage is required in modulating the transmissivity of the display element as explained below.

Here, according to "Handbook of Liquid Crystal", Vol. 1, p. 484-485, Wiley-VCH, 1998, the double refraction generated by an electric field application can be represented as follows.

$$\Delta n = \lambda B E^2$$

Note that, $\lambda$ is a optical wavelength, and B is Kerr constant, and E is an applied electric field intensity.

Kerr constant B is proportional to $$B \propto (T - T_{ni})^{-1}$$

Therefore, even though it is possible to drive the liquid crystal display element with a low electric field intensity when the temperature is around the transition point (Tni), high electric intensity drastically increases with a rise in temperature (T). On this account, at a temperature which is just above the phase transition temperature, it is possible to adequately modulate the transmissivity with a voltage of about 100V or lower. However, at a temperature which is very far from the phase transition temperature (a temperature which is enough higher than the transition temperature), a high voltage is necessary in order to modulate the transmissivity. Therefore, in the foregoing liquid crystal display element using the Kerr effect right above the transition temperature, it is necessary to carry out an extremely high-precision temperature control. As the accuracy of temperature control decreases, the drive voltage needs to be increased.

Figure 1:
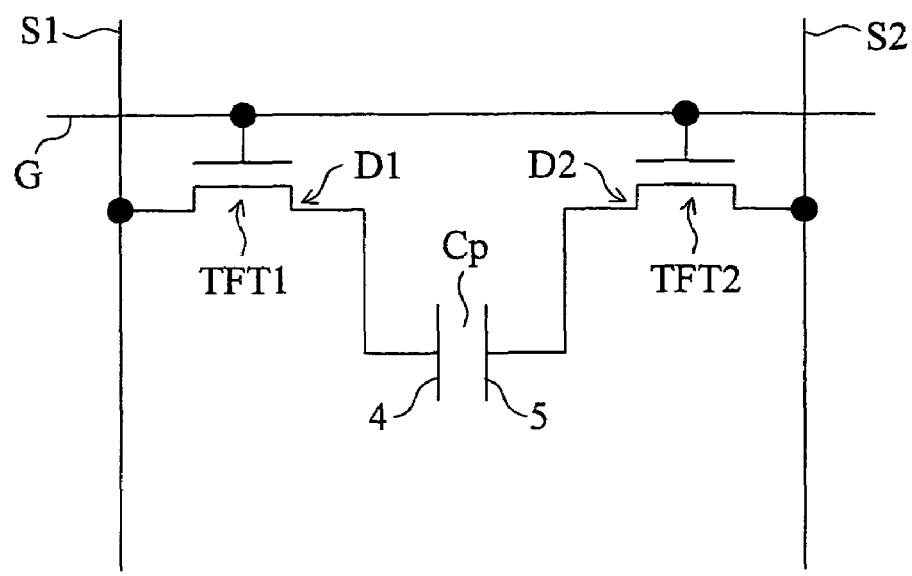
FIG. 1 is an equivalent circuit diagram showing a circuit layout of each display element in a display device according to one embodiment of the present invention.
Figure 5:
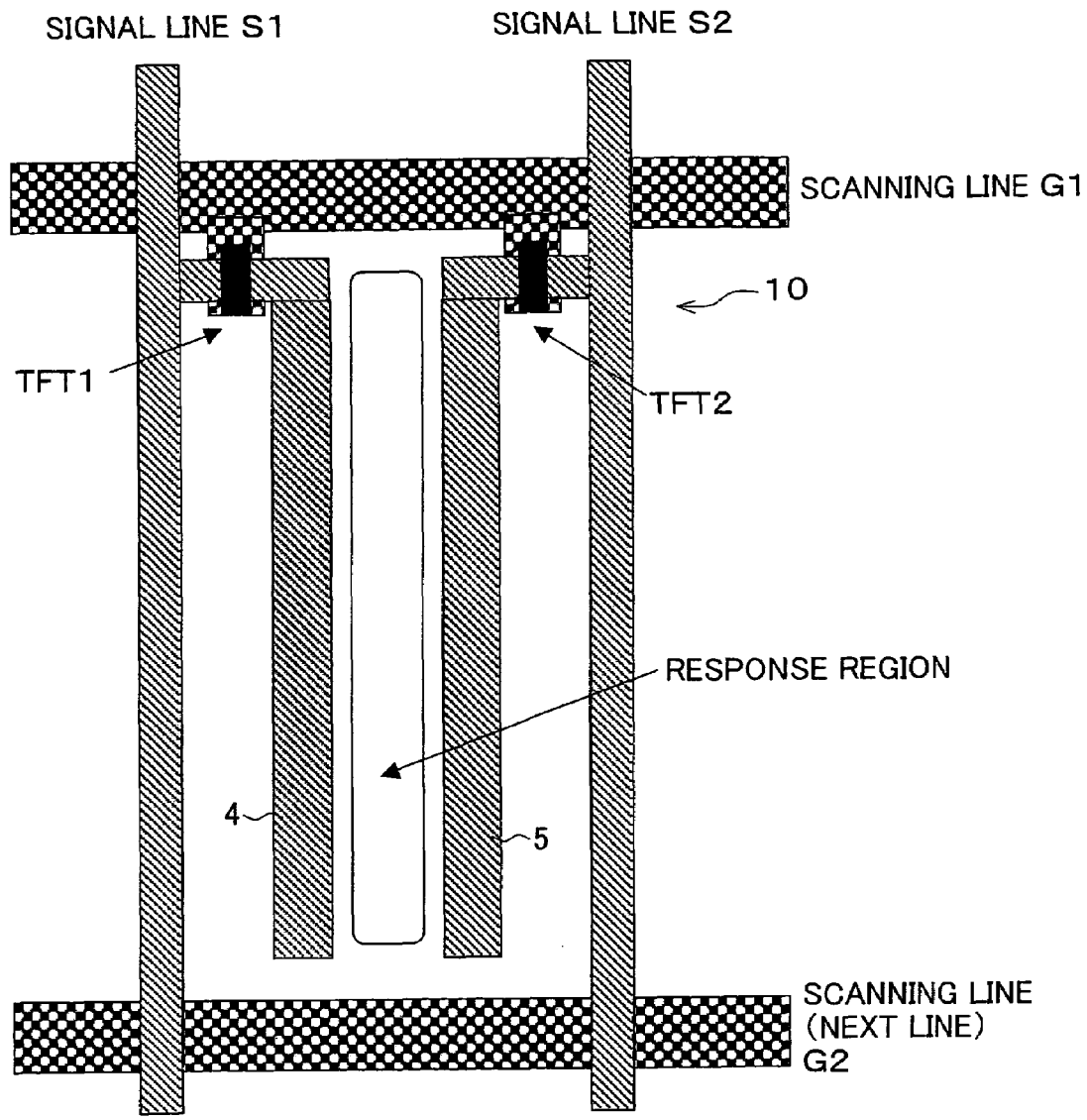
FIG. 5 is a schematic view showing a layout of a circuit formed on one of the substrates in each of display elements in a display device according to one embodiment of the present invention.

FIG. 1 is an equivalent circuit diagram illustrating a circuit structure of display element 10 of the present display device. FIG. 5 is a schematic view illustrating a structure of circuit provided on the substrate 1 of the display element 10.

As shown in the figures, in the present display device, the electrodes 4 and 5 constitute an element capacitor Cp. The electrode 4 is connected to the signal line S1 via the switching element TFT 1, and the electrode 5 is connected to the signal line S2 via the switching element TFT 2. That is, the present display device does not have a counter electrode line, and a pixel (display element) includes two signal lines (signal electrode lines) S1 and S2. With this structure, the signal electrode and the counter electrode are practically unified.

As described above, in the present display device, the two electrodes (electrodes 4 and 5) for applying a voltage to the medium sealed in the dielectric material layer 3 are connected to the drains D1 and D2 of the switching elements TFT1 and TFT2, respectively.

With this structure, in the present display device, signal is written between the electrodes 4 and 5 when the switching elements TFT1 and TFT2 are ON, and the electrodes 4 and 5 are disconnected from the electrode lines (signal lines) when the switching elements TFT1 and TFT2 are OFF. More specifically, in the present display device, the terminals (electrodes 4 and 5) of the two ends of the element capacitor Cp are connected to the signal lines S1 and S2 via the switching elements TFT1 and TFT2. Therefore, it is possible to turn the two terminals of the element capacitor Cp into high impedance state (insulated state) with respect to the signal lines S1 and S2.

On this account, during the writing of an inversed polarity into another display element connected to another scanning line (e.g. scanning line G2), the potential of the electrodes 4 and 5 of the subject display element 10 (the display element 10 connected to the scanning line G1) is kept at a constant level. Therefore, unlike the conventional liquid crystal display device, the fluctuation of drain potential does not occur, and the gate voltage for driving the switching element TFT does not need to be increased.

On this account, in the present display device, the voltage applied to the scanning line G can be reduced, and durability of the switching elements TFT 1 and TFT 2 increases. Further, for example, even when a large voltage is applied to the signal lines S1 and S2 to increase the drive voltage, the durability of the switching elements TFT 1 and TFT 2 will not be decreased.

The present display device thus carries out high-voltage driving. This effect of the present display device allows high voltage driving in a display device using a photoelectronic effect. A display device with a high speed response characteristic and a high viewing angle characteristic is thus realized.

Note that, in the present display device, the switching elements TFT 1 and TFT 2 connected to the electrodes 4 and 5 are both turned on to apply a signal voltage to the element capacitor Cp (between electrodes 4 and 5), and the switching elements TFT 1 and TFT 2 connected to the electrodes 4 and 5 are both turned off to stop signal voltage application to the element capacitor Cp. A voltage shift (voltage fluctuation) occurs in the electrode 4 due to the parasitic capacitor existing between the drain of the switching element TFT 1 and the scanning line G. This voltage shift has a similar tendency to that of the voltage shift of the electrode 5 caused by a parasitic capacitor between the drain of the switching element TFT 2 and the scanning line G. Therefore, these voltage shifts having the similar tendencies tend to be balanced off. The problem of voltage shift in the two electrodes thus becomes less significant.

The parasitic capacitor exists, for example, in a region of the switching element (TFT) where the drain electrode and the scanning line are overlaid, that is, an insulating layer between the drain electrode and the gate electrode of the switching element (TFT). Outside the switching element, the parasitic capacitor exists in a region where the drain electrode and the scanning line are most closely horizontally adjacent.

Further, the switching elements TFT 1 and TFT 2 are preferably structured in similar manners. More specifically, the parasitic capacitors respectively generated between their drain electrodes and the gate electrodes are preferably similar. Further, the electrodes 4 and 5, the switching elements TFT 1 and TFT 2, and the scanning line G are preferably laid out so that the parasitic capacitors respectively generated between the electrode 4/5 and the scanning line become similar. With this layout, the voltage shifts due to the parasitic capacitors in the electrodes 4 and 5 become similar, and cancel each other. On this account, the problem of the voltage shift therefore does not need to be taken into account.

Note that, a general panel with a large number of pixels (e.g. TV) requires a large switching element (TFT) to ensure the charging capability. In other words, the charging capability and the parasitic capacitor trade off each other. Therefore, the structure of the present display device is particularly useful for a panel with a large number of pixels.

Figure 15:
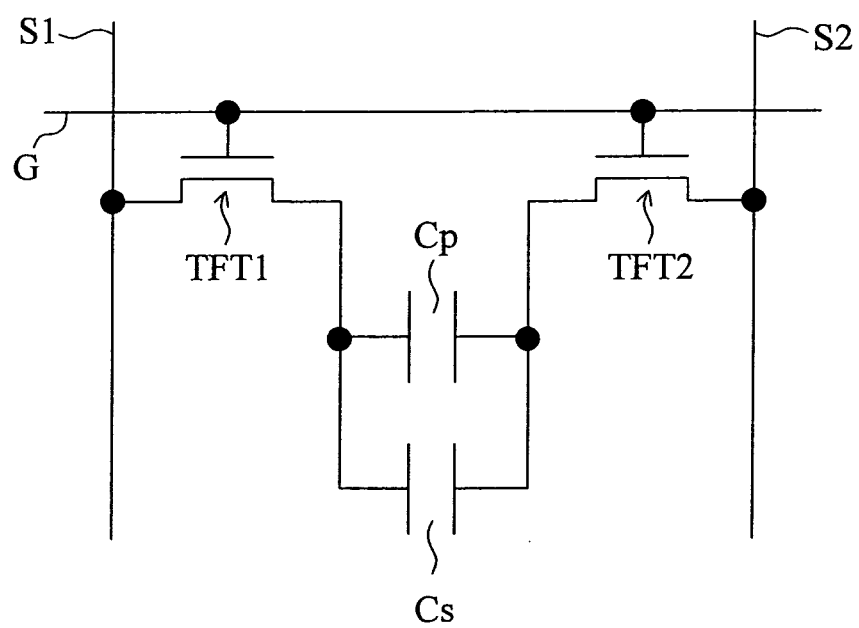
FIG. 15 is an equivalent circuit diagram showing a structure example with an auxiliary capacitor for each display element provided in a display device according to one embodiment of the present invention.
Figure 16:
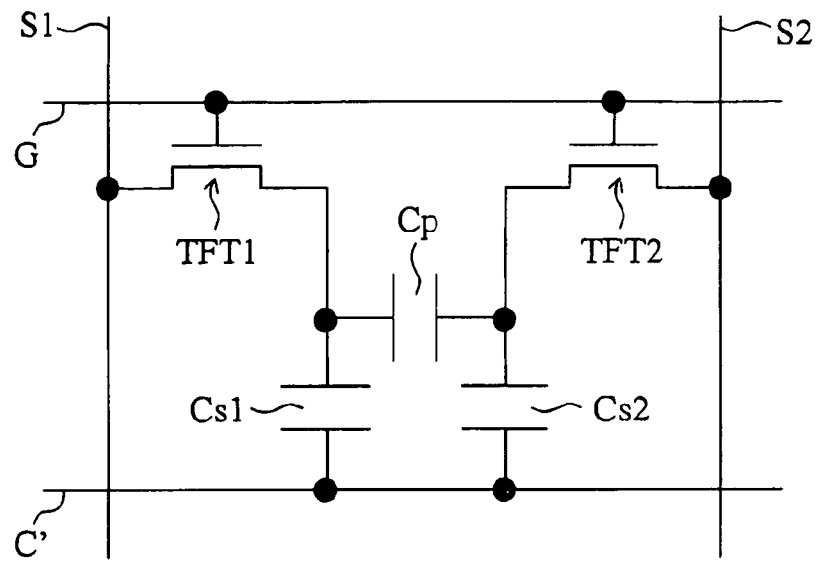
FIG. 16 is an equivalent circuit diagram showing another structure example with an auxiliary capacitor for each display element provided in a display device according to one embodiment of the present invention.
Figure 17:
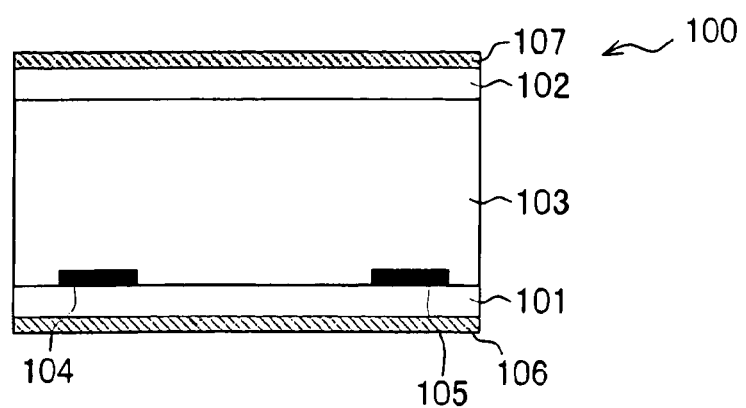
FIG. 17 is a cross-sectional view showing a structure of a display element provided in a conventional liquid crystal display device.
Figure 18:
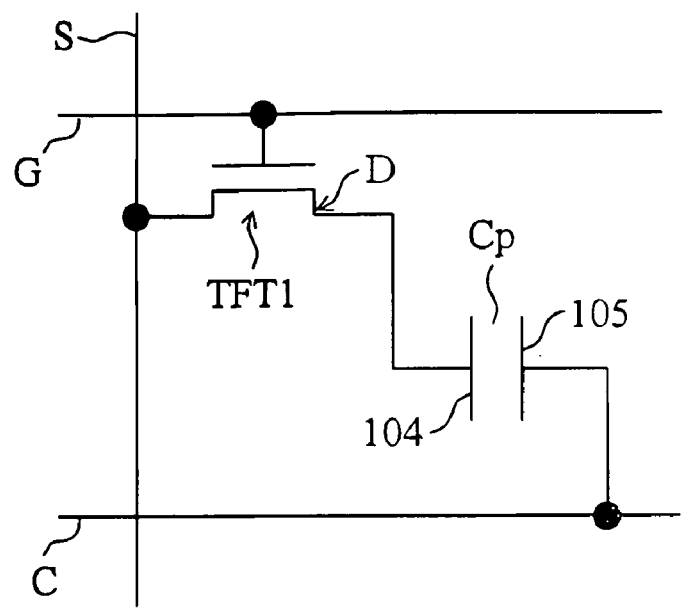
FIG. 18 is an equivalent circuit diagram showing a circuit layout of each display element in a conventional display device.
Figure 19:
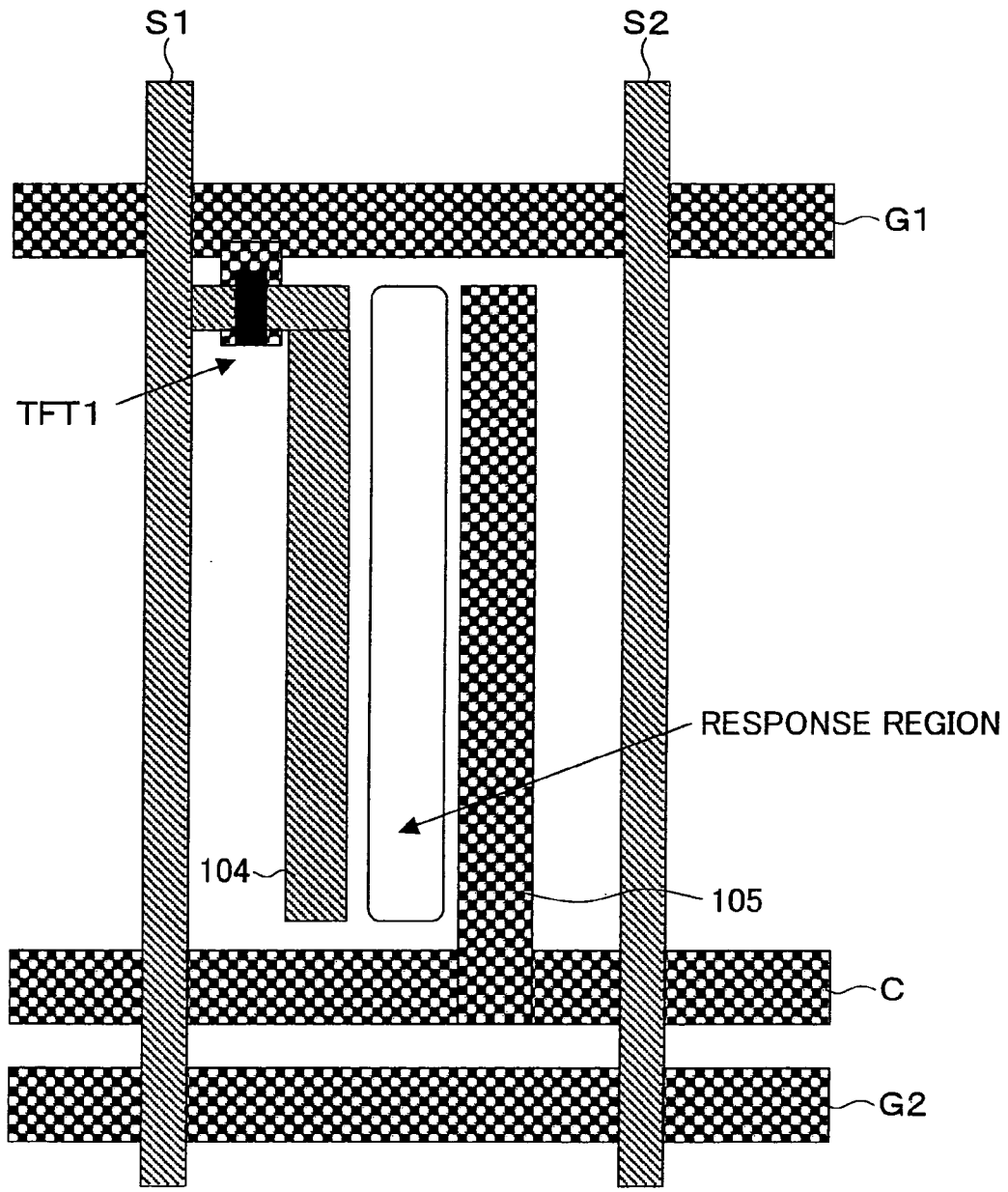
FIG. 19 is a schematic view showing a layout of a circuit formed on one of the substrates in each of display elements in a display device according to one embodiment of the present invention.
Figure 19:
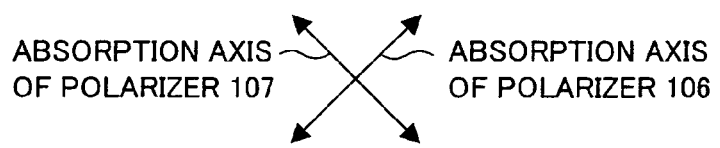
Figure 20:
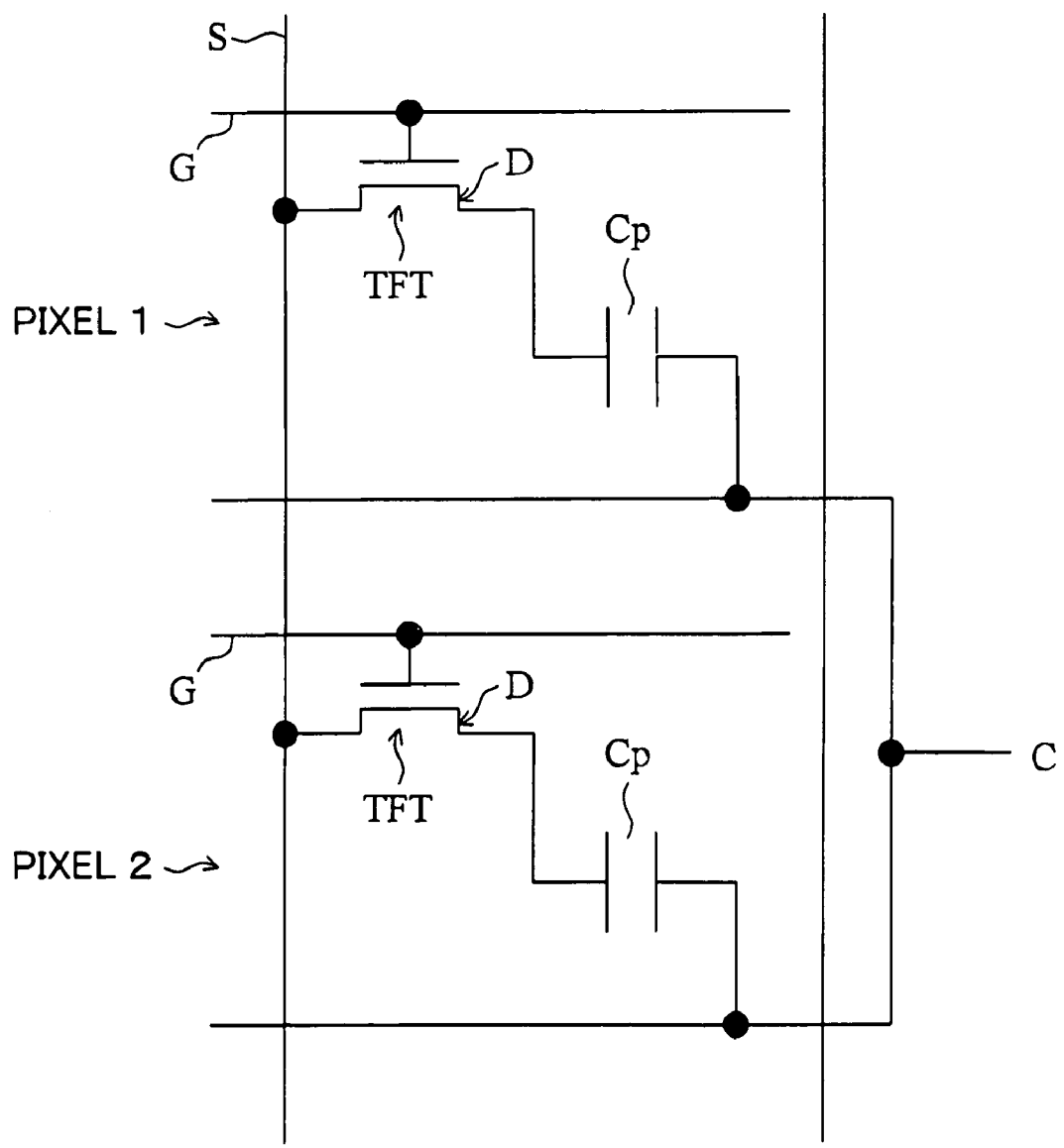
FIG. 20 is an equivalent circuit diagram of two adjacent pixels respectively connected to different scanning lines in a conventional liquid crystal display device.
Figure 21:
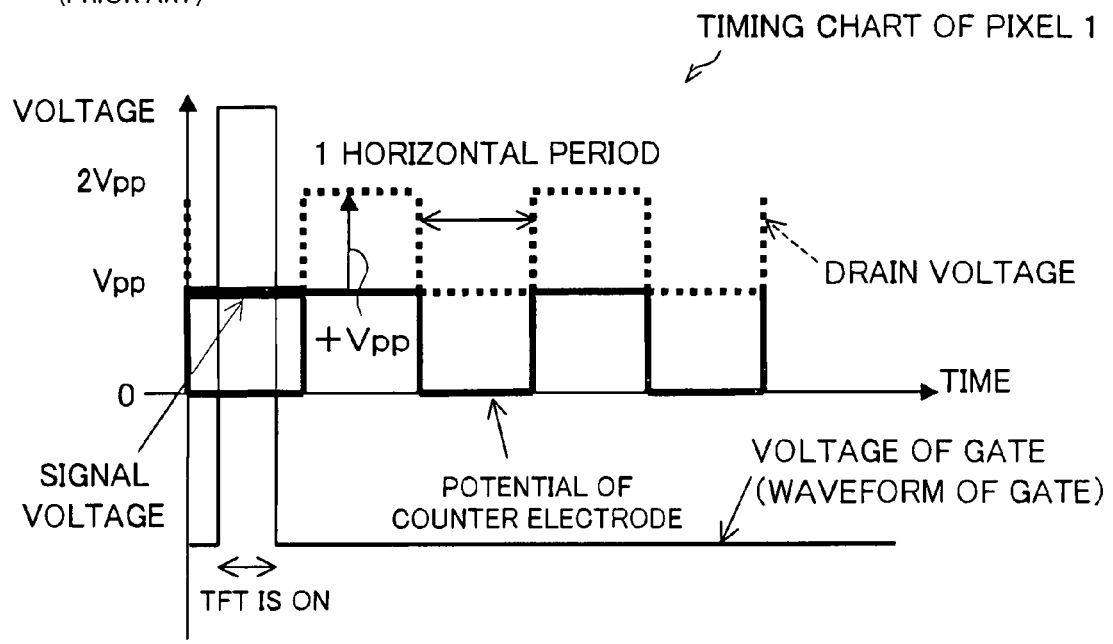
FIG. 21 is a timing chart showing examples of voltage state of the respective sections of two adjacent pixels respectively connected to different scanning lines in a conventional liquid crystal display device.
Figure 21:
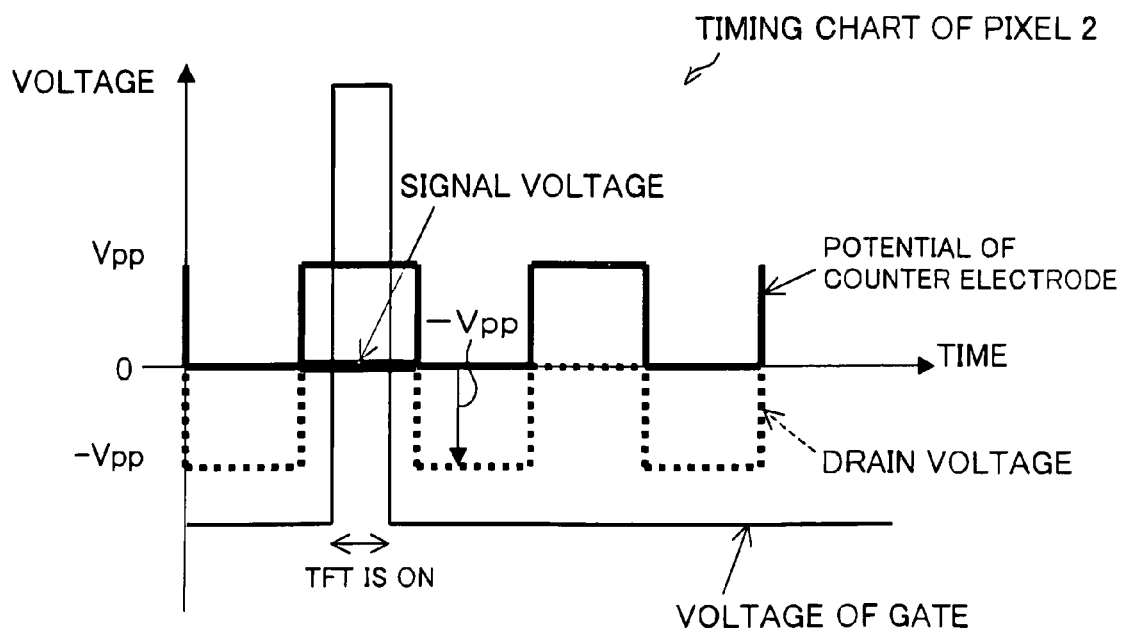

Further, in the circuit layout of the present display device shown in FIG. 1, the display element 10 may have an auxiliary capacitor. For example, as shown in FIG. 15, the auxiliary capacitor Cs may be connected to the element capacitor Cp (the electrodes 4 and 5) in parallel. Alternatively, as shown in FIG. 16, an auxiliary capacitor wire C' and two auxiliary capacitors Cs1 and Cs2 may be added to the circuit of FIG. 1. In this case, the electrodes 4 and 5 of the element capacitor Cp are connected to the auxiliary capacitor wire C' via the auxiliary capacitors Cs1 and Cs2, respectively. With this structure having auxiliary capacitors, the influence of leak current in the switching element TFT 1/2 is reduced.

One of the advantages of the present display device is reduction of drive voltage which becomes more significant when a material of greater polarity is used. In this case, a larger amount of impurity ion or the like is likely to be contained, which means leak current is more likely to occur in the pixel capacitor. However, the auxiliary capacitor also has an effect of reducing this influence. This is another advantage of the auxiliary capacitor.

Further, in the present display device, the electrodes 4 and 5 are formed only on the substrate 1, but may be formed both on the substrates 1 and 2.

Further, in the present display device, the compound A is sealed in the dielectric material layer 3 as a medium; however, the present invention allows the use of other liquid crystal material as the medium. In this case, the material may be a single compound exhibiting a liquid crystal property, or a plurality of compounds which exhibit a liquid crystal property together. These compounds may include non-liquid crystal materials.

For example, the liquid crystal materials listed in the foregoing specification Tokukai 2001-249363, that is, 5CB (4-cyano-4'-n-pentylbiphenyl), 5OCB (4-cyano-4'-n-pentyloxybiphenyl), a mixture of equal amounts of 3OCB (4-cyano-4'-n-propyloxybiphenyl), 5OCB and 7OCB (4-cyano-4'-n-heptyloxybiphenyl), PCH5 (trans-4-heptyl-(4-cyanophenyl)cyclohexan), or a mixture of 3HPFF, 5HPFF and 7HPFF. The 3HPFF refers to 1,2-difluoro-4-[trans-4-(trans-4-n-propylcyclohexyl)cyclohexyl]benzene. The 5HPFF refers to 1,2-difluoro-4-[trans-4-(trans-4-n-pentylcyclohexyl)cyclohexyl]benzene. The 7HPFF refers to 1,2-difluoro-4-[trans-4-(trans-4-n-heptylcyclohexyl)cyclohexyl]benzene. These liquid crystal materials may include a solvent.

Further, as another possible material, the liquid crystal material disclosed in Japanese Laid-Open Patent Application Tokukaihei 11-183937/1999 (published on Jul. 9, 1999) may be used. This liquid crystal material is divided into small regions by a reticulate polymer, microcapsule, pore inorganic substance etc.

Still another possible material may be a polymer dispersed liquid crystal display system (Nematic/polymer composite system) disclosed in Shiro Matsumoto, et al, "Fine droplets of liquid crystals in a transparent polymer and their response to an electric field", Appl. Phys, Lett., 1996, vol. 69, pp. 1044-1046. Yet another possible material may be a gelatinizer disclosed in Norihiro Mizoshita, Kenji Hanabusa, Takashi Kato "Fast and High-Contrast Elecro-optical Switching of Liquid-Crystalline Physical Gels: Formation of Oriented Microphase-Separated Structures", Advanced Functional Materials, April 2003, Vol. 13, No. 4, p 313-317).

Further, the medium sealed into the substrate (dielectric material layer 3) may be a material showing Kerr effect (electro-optic effect), such as PLZT (Lead Zirconium Titanate, doped with a little lanthanum; La-modified lead zirconate titanate), or a material containing polar molecules, such as nitrobenzene. In any case, it is preferable that the medium be a material which is substantially optically isotropic when no electric field is applied, and which induce the optical modulation when an electric field is applied. Typically, it is preferable that the medium be a material in which the birefringence is improved by electric field application.

Further, the medium sealed in the dielectric material layer 3 may be any medium having a property of causing a change in degree of optical anisotropy in response to electric field application. For example, the medium may be a medium that is optically isotropic when no electric field is applied, but becomes optically anisotropic by application of electric field. In this case, the refractive index ellipsoid has a round shape when no external field is applied, and becomes an oval by application of external field. On the contrary, the medium may be a medium that is optically anisotropic and loses the optical anisotropy in response to electric field application, thereby exhibiting optical isotropy. In this case, the refractive index ellipsoid has an oval shape when no electric field is applied, and becomes round by application of electric field. Further, the medium may be a medium that is optically anisotropic when no electric field is applied, and causes a change in degree of optically anisotropy by application of electric field.

In this case, the refractive index ellipsoid has an oval shape and changes into a different oval by application of external field.

For example, one suitable example is a liquid crystal phase having a nano scale structure, which is optically isotropic. By applying a field to such a medium, micro structures of the molecules or the molecular agglomerations are distorted, thereby inducing the optical modulation.

Further, the medium may be a system made up of liquid crystal molecules forming agglomerations orientated radially in a size smaller than optical wavelength, so that the system appears to be optically isotropic. By applying a field to such a medium, micro structures of the molecules or the molecular agglomerations are distorted, thereby inducing the optical modulation.

The following describes an example of the medium. However, the medium example below is one of possible examples, and the medium used for the display element of the present invention is not limited to this example.

Medium Example 1

One typical example is a liquid crystal used for a conventional IPS mode liquid crystal display device (e.g. Nematic liquid crystal). That is, the structure of the present display device is applicable for an IPS mode liquid crystal display element.

Figure 6:
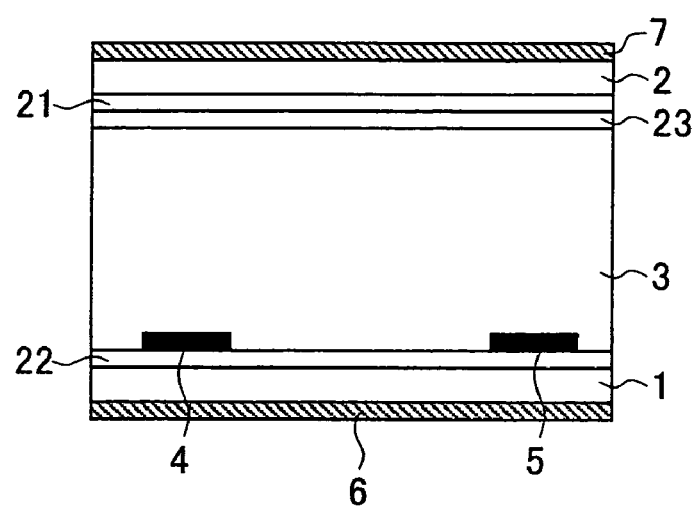
FIG. 6 is a cross-sectional view showing a structure example with a horizontal alignment film and a color field for a display element provided in a display device according to one embodiment of the present invention.

In this case, for example, the display element provided in the present display device may have the structure shown as the display element 20 in FIG. 6.

As shown in FIG. 6, the display element 20 is structured in the same manner as that of FIG. 2(*a*)/(*b*), but additionally includes a color filter layer (CF layer) 21 beneath the substrate 2. Further, horizontal alignment films 22 and 23 are formed beneath the substrates 1 and 2. The horizontal alignment films 22 and 23 each have been rubbed by about 10° (clockwise or unticlockwise) with respect to the extension direction (the direction vertical to that of electric field) of the electrodes (pixel electrodes) 4 and 5.

The substrates 1 and 2 are bonded together with a 5 μm gap (i.e. the width of the dielectric material layer 3). Nematic liquid crystal is sealed in the dielectric material layer 3. In this structure, the substrates 1 and 2 may be expressed as a TFT substrate and a CF substrate, respectively.

As described, the present display device ensures substantially the same effect as that of the structure using the compound A when realized as an IPS mode liquid crystal display device. Therefore, the voltage applied to the scanning line G may be reduced, thereby increasing durability of the switching elements 1 and 2. Further, for example, even when a large voltage is applied to the signal lines S1 and S2 to increase the drive voltage, the durability of the switching elements TFT 1 and TFT 2 will not be decreased.

With such a structure, the present display device is capable of higher voltage driving than the conventional IPS liquid crystal display device. Therefore, high-speed response is ensured. Further, the aperture ratio is increased, as the gap between the electrodes (electrode 4 and electrode 5) is increased.

Note that, in the foregoing example, the horizontal alignment films 22 and 23 each have been rubbed by about 10° with respect to the extension direction of the electrodes 4 and 5; however, the present invention is not limited to this arrangement. The rubbing angle for the horizontal alignment film 22/23 with respect to the electrodes 4 and 5 may be arbitrarily determined. Also, though the substrates 1 and 2 are bonded together with a 5 μm gap in the foregoing example, the width of gap may be arbitrarily determined.

Medium Example 2

Further, in the present display device shown in FIGS. 2(*a*) and 2(*b*), other medium than the compound A may be sealed in the dielectric material layer 3 as the medium which changes in degree of optical anisotropy in response to electric field application.

Such a medium can be, for example, a BABH8 described in Makoto Yoneya, "Examining nano-structured liquid crystal phase by molecular simulation" EKISHO, 2003, Vol. 7, No. 3, pp. 238-245 and "Handbook of Liquid Crystals, Vol. 2B, p. 887-900, Wiley-VCH, 1998. This BABH8 is denoted by the following structural formula (2).

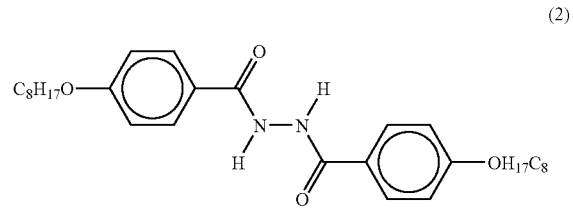

(2)

The following explains the display principle of the present display device in the case of using BABH8 as the material sealed in the dielectric material layer 3; more specifically, in the case where BABH8 is used in the structure shown in FIGS. 2(*a*) and 2(*b*) as the medium sealed in the dielectric material layer 3.

Figure 7:
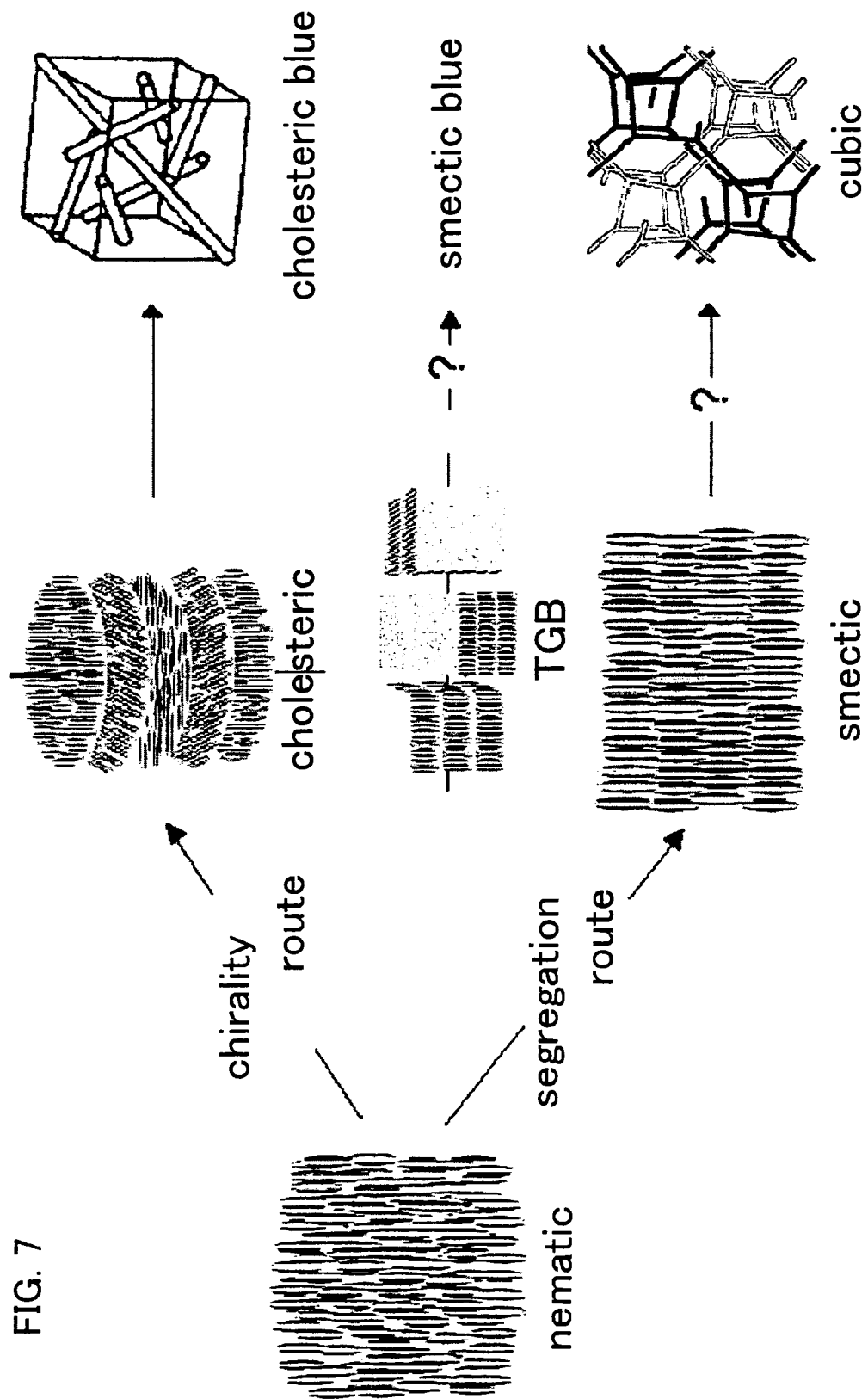
FIG. 7 illustrates structure models of various liquid crystal phases.
Figure 8:
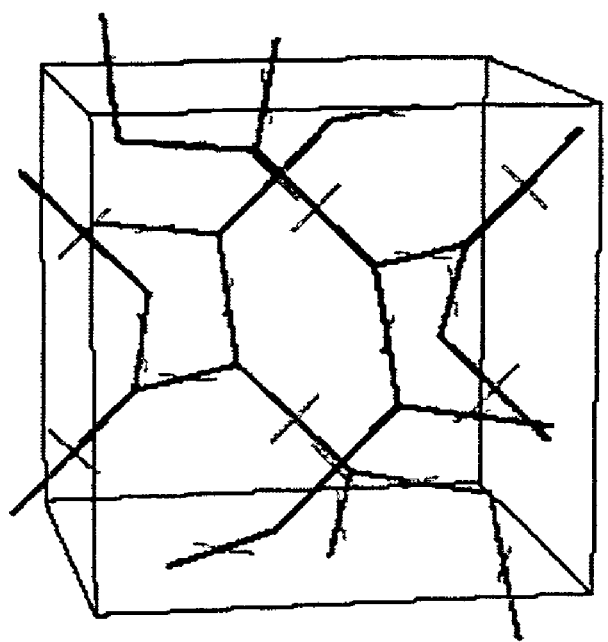
FIG. 8 illustrates a structure model (rod network model) of a cubic phase.
Figure 9:
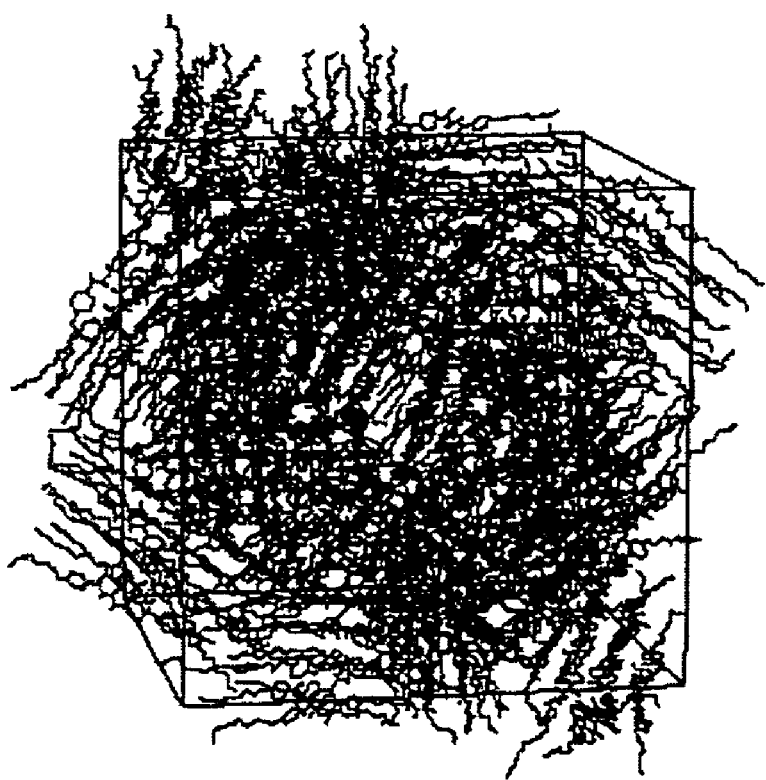
FIG. 9 illustrates a structure model of a cubic phase.

The temperature of the dielectric material layer 3 is set within a range from 136.7° C. to 161° C. In this temperature range, the BABH8 in this example exhibits a cubic phase having an orderly structure in a scale smaller than optical wavelength (wavelength of visible light). The orderly structure (alignment order) has a cubic symmetry with a grating constant of approximately 6 nm, which is equal to or less than one tenth of the optical wavelength. Note that, Makoto Yoneya, "Examining nano-structured liquid crystal phase by molecular simulation" EKISHO, 2003, Vol. 7, No. 3, pp. 238-245 describes a structure model of the cubic phase as shown in FIGS. 7 through 9.

As described above, the BABH8 is transparent, and has an orderly structure smaller than the optical wavelength. Therefore, when no field is applied in the foregoing temperature range, the BABH8 exhibits optical isotropy (at least isotropic in broad view). Accordingly, by using such a BABH8, the display element of the present embodiment performs superior black display with crossed nicols configuration.

Meanwhile, when a field is applied between the electrodes 4 and 5 while keeping the material layer 3 in a range between 136.7° C. to 161° C., the structure with a cubic symmetry is distorted, thus expressing an optical isotropy. In other words, at the foregoing temperature range, the BABH8 is optically isotropic when no field is applied in the foregoing temperature range, and expresses an optical isotropy in response to field application.

As described, in the display device of the present embodiment having the foregoing structure, the structure having a cubic symmetry is distorted in response to field application, that results in generation of birefringence, thus performing superior white display. Note that, the birefringence is generated in a constant direction but the degree is changed depending on the field application. Further, the voltage transmittance curve, that denotes the relation between the transmittance and the voltage (electric field) applied between the electrodes 4 and 5, draws a stable curve in a wide temperature range as specified above. That is, the display element of the present embodiment having the foregoing structure obtains a stable voltage transmittance curve at a temperature range of appropriately 20K, from 136.7° C. to 161° C. Therefore, the temperature control is very easy in the display element.

The following explains the difference in display principal between a liquid crystal display element according to a conventional display method and the display element according to the present embodiment using BABH8 as a medium.

Figure 10:
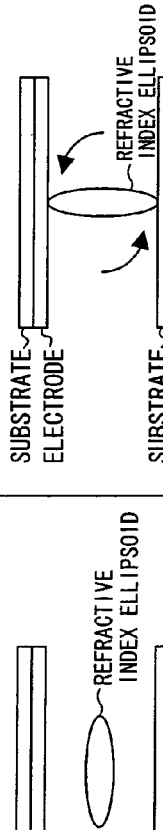
FIG. 10 is an explanatory view showing the difference in display principal between a liquid crystal display element according to a conventional display method and a display element according to one embodiment of the present invention in which BABH8 is sealed in the dielectric layer.

FIG. 10 is an explanatory view schematically illustrating shapes and directions of refractive index ellipsoids with and without field application, so as to show the difference in display principal between the liquid crystal display element according to a conventional display method and the display element according to the present embodiment using BABH8. Note that, FIG. 10 depicts the display principles of the TN (Twisted Nematic) mode, VA (Vertical Alignment) mode, and IPS (In Plane Switching) mode as the conventional display modes.

As shown in the figure, the liquid crystal display element of the TN mode is arranged so that a liquid crystal layer is sandwiched between two opposed substrates, each of which is thereon provided with a transparent electrode (electrode). When no field is applied, the major axes of the liquid crystal molecules are helically aligned; when a field is applied, the major axes of the liquid crystal molecules are aligned along the field direction. In this case, as shown in FIG. 10, an average refractive index ellipsoid is orientated in such a manner that, when no field is applied, the major axes are aligned in parallel to the substrate surface; when the field is applied, the major axes are orientated along the substrate normal direction. That is, the refractive index ellipsoid has the ellipsoidal shape with or without field application, but the direction of the major axis is changed according to whether a field is applied or not (the refractive index ellipsoid rotates). Further, the refractive index ellipsoid causes little change in shape according to whether a field is applied or not. Further, as with the liquid crystal element of TN mode, the liquid crystal display element of the VA mode is arranged so that a liquid crystal layer is sandwiched between two opposed substrates, each of which is thereon provided with a transparent electrode (electrode). However, in this element, when no field is applied, the major axes of the liquid crystal molecules in the liquid crystal layer are aligned in a substantially perpendicular direction with respect to the substrate surface; when a field is applied, the major axes of the liquid crystal molecules are aligned in a perpendicular direction to the field. As shown in FIG. 10, the major axes are aligned in the normal direction of the substrate surface when no electric field is applied, and are aligned in the direction parallel to the substrate surface when an electric field is applied. That is, the refractive index ellipsoid has the ellipsoidal shape with or without field application, but the direction of the major axis (direction of refractive index ellipsoid) is changed according to whether a field is applied or not, that is, the refractive index ellipsoid rotates. Further, the refractive index ellipsoid causes little change in shape according to whether a field is applied or not.

Further, the liquid crystal element of IPS mode includes one substrate with a pair of electrodes that have a liquid crystal layer therebetween. Further, the alignment direction of the liquid crystal molecules is changed by field application so that the display condition is changeable according to whether a field is applied or not. Therefore, as shown in FIG. 10, the refractive index ellipsoid has the ellipsoidal shape also in the IPS mode with or without field application, but the direction of the major axis is changed according to whether a field is applied or not (the refractive index ellipsoid rotates). Further, the refractive index ellipsoid causes little change in shape according to whether a field is applied or not. As described, the liquid crystal display element according to a conventional display method perform display (transmittance modulation) in such a principle that the liquid crystal molecules are aligned in a certain direction even when no field is applied, and the molecules are simultaneously turned to a different direction in response to field application.

That is, in the liquid crystal display element according to a conventional display method, the display operation is performed using the property of the refractive index ellipsoids that have the ellipsoidal shape with or without field application, but change in direction (the refractive index ellipsoid rotates) of the major axes by field application. Further, the refractive index ellipsoid causes little change in shape according to whether a field is applied or not. Accordingly, the degree of alignment order of the major axes of the refractive index ellipsoids is constant at a wavelength equal to or higher than the wavelength of visible light, but the alignment direction changes. The display is performed using this property.

Note that, the present display device using BABH8 does not use an isotropic phase (so called a liquid phase), and therefore differs from the conventional liquid crystal display device. The isotropic phase designates a phase in which the molecules are isotropically aligned.

On the other hand, unlike the conventional liquid crystal element, the refractive index ellipsoids of the display element of the present invention using BABH8 have round shapes as shown in FIG. 10. That is, the display element is optically isotropic (an orientational order parameter for visible light or a greater scale=0; in other words, the degree of orderly structure is so small that it gives no effect to wavelength equal to or greater than the wavelength of visible light) when no electric field is applied. However, when a field is applied, optical anisotropy occurs (an orientational order parameter for visible light or a greater scale>0; in other words, the degree of orderly structure becomes larger, so that it gives an effect to wavelength equal to or greater than the wavelength of visible light), so that the refractive index ellipsoids become oval shapes. That is, in the display element using BABH8, the shapes of the refractive index ellipsoids are isotropic ($nx=ny=nz$) when no field is applied, but they exhibit anisotropy ($nx>ny$) in shape in response to field application. Here, $nx$, $ny$ and $nz$ denote respective refractivities for (i) the direction in parallel with the substrate surface and parallel with the counter direction of the two substrates, for (ii) the direction parallel with the substrate surface and perpendicular to the counter direction of the two substrates, and for (iii) the direction perpendicular to the substrate surface.

Further, the major axis of refractive index ellipsoid is always parallel (in the case of a medium positive in dielectric anisotropy) or perpendicular (in the case of a medium negative in dielectric anisotropy) to the field direction when an electrical field is applied.

On the other hand, in the conventional liquid crystal display element, display operation is carried out by rotating the major axis of the refractive index ellipsoid by application of field, and therefore, the major axis of the refractive index ellipsoid is not always perpendicular or parallel to field direction.

As explained, in the display element according to the present embodiment comprising the BABH8, the direction of the optical anisotropy is constant (the same field application direction), and the display operation is performed by changing the orientational order parameter which influences visible light. More specifically, in the display element according to the present embodiment comprising the BABH8, the degree of optical anisotropy (or the orientational order which influences visible light) of the medium changes. That surely distinguishes the display element according to the present embodiment comprising the BABH8 in display principle from the liquid crystal elements for other display methods. Moreover, in the display element according to the present embodiment using BABH8, since the display operation is performed by changing the degree of optical anisotropy of the medium, in other words, by using disturbance of the structure having a cubic symmetry, the display element achieves a wide viewing angle characteristic, that cannot be obtained by the display device according to the conventional method that performs display by changing alignment direction of the liquid crystal molecules. Further, in the display element according to the present embodiment using BABH8, the direction of induced birefringence is constant, that keeps the optical axis in the same direction, thereby obtaining a wider viewing angle characteristic.

Further, the display element according to the present embodiment using BABH8 carries out display by using optical anisotropy induced by disturbance of the structure (crystal-like lattice) of a microdomain. Therefore, unlike the conventional display principle, there is no defect of the particular viscosity of the liquid crystal that greatly affects the response speed, thereby realizing high-speed response, for example, 1 ms. More specifically, the conventional display principle performs display by using changes in alignment direction of the liquid crystal molecules, and therefore suffers from the defect of the particular viscosity of the liquid crystal that greatly affects the response speed; on the other hand, the display element according to the present embodiment using BABH8 uses disturbance of the structure of a microdomain, and therefore has a little effect of the particular viscosity of the liquid crystal, thereby realizing high-speed response. With this advantage of high-speed response, the display element according to the present embodiment is suitable for a display device using a field sequential color method or the like.

Note that, though the foregoing example uses BABH8 as a medium which changes in degree of optical anisotropy, the present invention may use other medium having molecules exhibiting a cubic symmetry than BABH8.

Medium Example 3

As the medium injected and sealed in the dielectric material layer 3 of the present display element (for example, display element illustrated in FIGS. 1(a), 1(b), and 2(a), 2(b), it is possible to apply a medium which is made of molecules in the smectic D phase which is one of the liquid crystal phases.

One example of liquid crystal materials in the smectic D phase is ANBC16. Note that, ANBC16 is mentioned in Kazuya Saito, and Michio Sorai, "Thermodynamics of a unique thermo-tropic liquid crystal having optical isotropy", Liquid Crystal, 2001, Vol. 5, No. 1 (p. 21, FIG. 1, Structure 1 (n=16)) and "Handbook of Liquid Crystals", Wiley-VCH, 1998, vol. 2B (p. 888, Table 1, Compound No. 1, Compound 1a, Compound 1a-1). The following structural formulas (3) and (4) show the molecule structure of ANBC16.

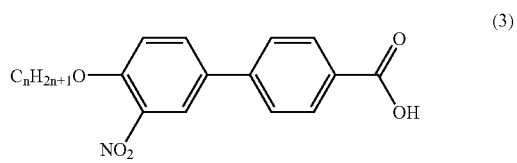

(3)

4'n-Alkoxy-3'-substituted-biphenyl-4-carboxylic acids

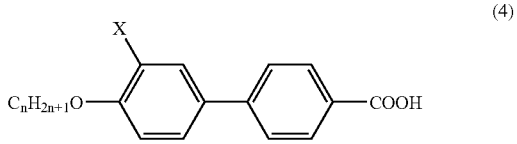

(4)

4'n-alkoxy-3'-nitro-biphenyl-4-carboxylic acids
X=NO2 n–15 Cr 127 SmC 187 Cub 198 SmA 204 I The liquid crystal material (ANBC16, n=16 in the structural formula (3)) is in the smectic D phase in a temperature range from 171.0° C. to 197.2° C. In the smectic D phase, a plurality of molecules form a three-dimensional grating like a Jungle Gym®, and its grating constant is several dozen nm or less, that is, smaller than the optical wavelength. That is, the smectic D phase has a cubic symmetry and has the orientational order (orderly structure) which smaller than the optical wavelength. Note that, ANBC16 of the present embodiment is about 6 nm. That is, the smectic D phase is optically isotropic.

Further, when an electric field is applied to the dielectric material layer 3 made of ANBC16 in the above temperature range in which ANBC16 shows the smectic D phase, molecules tend to change their directions to the direction of the electric field because the molecules have dielectric anisotropy. As a result, the grating structure is distorted. That is, the dielectric material layer 3 expresses the optical anisotropy.

Therefore, it is possible to apply ANBC16 as the medium injected and sealed in the dielectric material layer 3 of the present display element. Note that, other materials showing the smectic D phase than ANBC16 may also be applicable as the medium injected and sealed in the dielectric material layer 3 of the present display element, because the smectic D phase always causes a change in degree of optical anisotropy depending on whether or not an electric field is applied.

Medium Example 4

A liquid crystal micro emulsion may also be used for the medium to be sealed in the material layer 3 of the present display device. Here, the liquid crystal micro emulsion is a general name of such a system (mixture system) that the oil molecules of the O/W-type micro emulsion (a system comprising waterdrops dissolved in oil using a surfactant, the system having continuous oil phases) are replaced with thermotropic liquid crystal molecules, which system was originally named by the researchers led by Jun Yamamoto, the author of "liquid crystal micro emersion" (see EKISHO, Vol 4, No. 3, P. 248-254, year of 2000).

Figure 11:
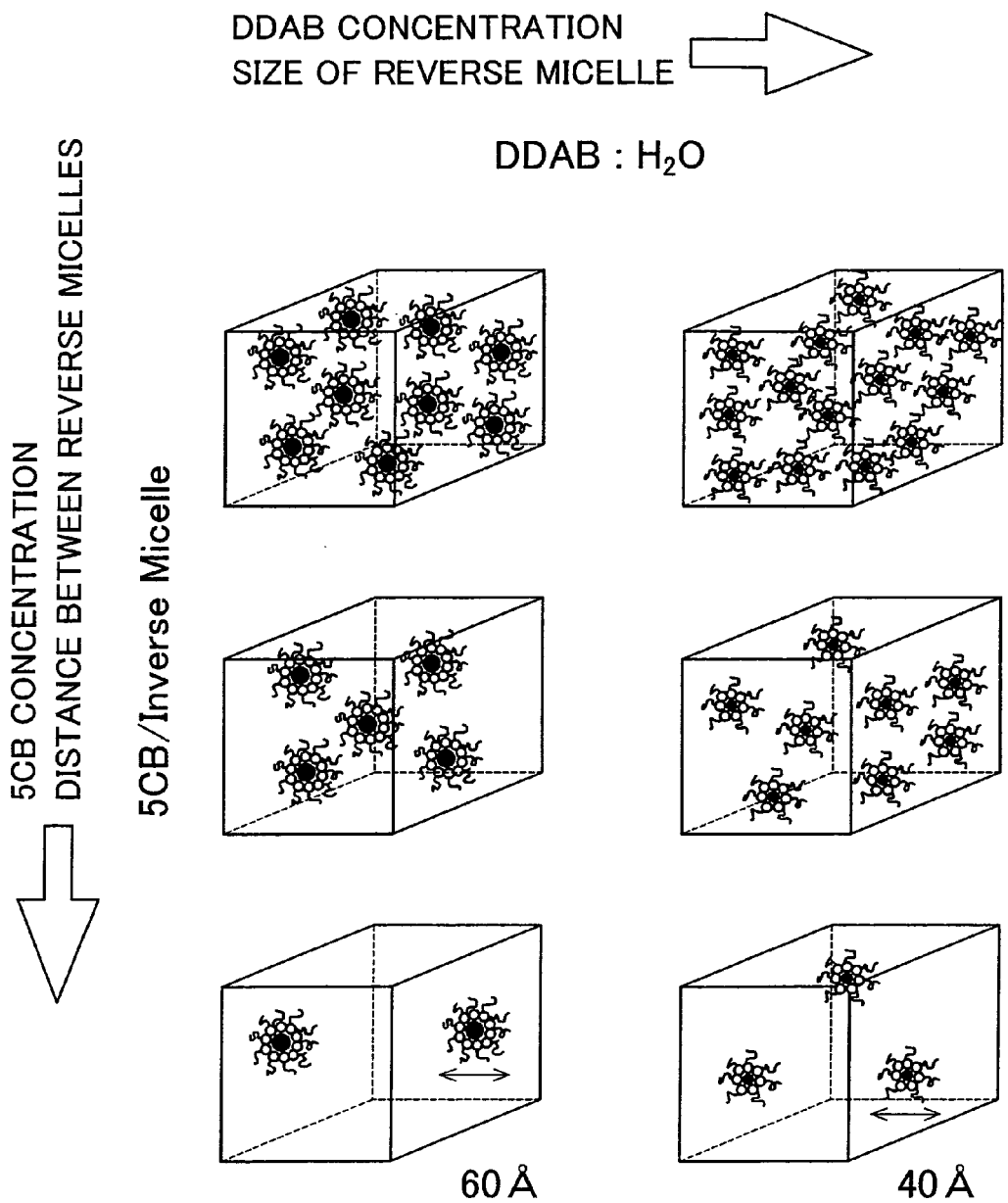
FIG. 11 is a schematic view illustrating a structure of a liquid crystal micro emulsion.
Figure 12:
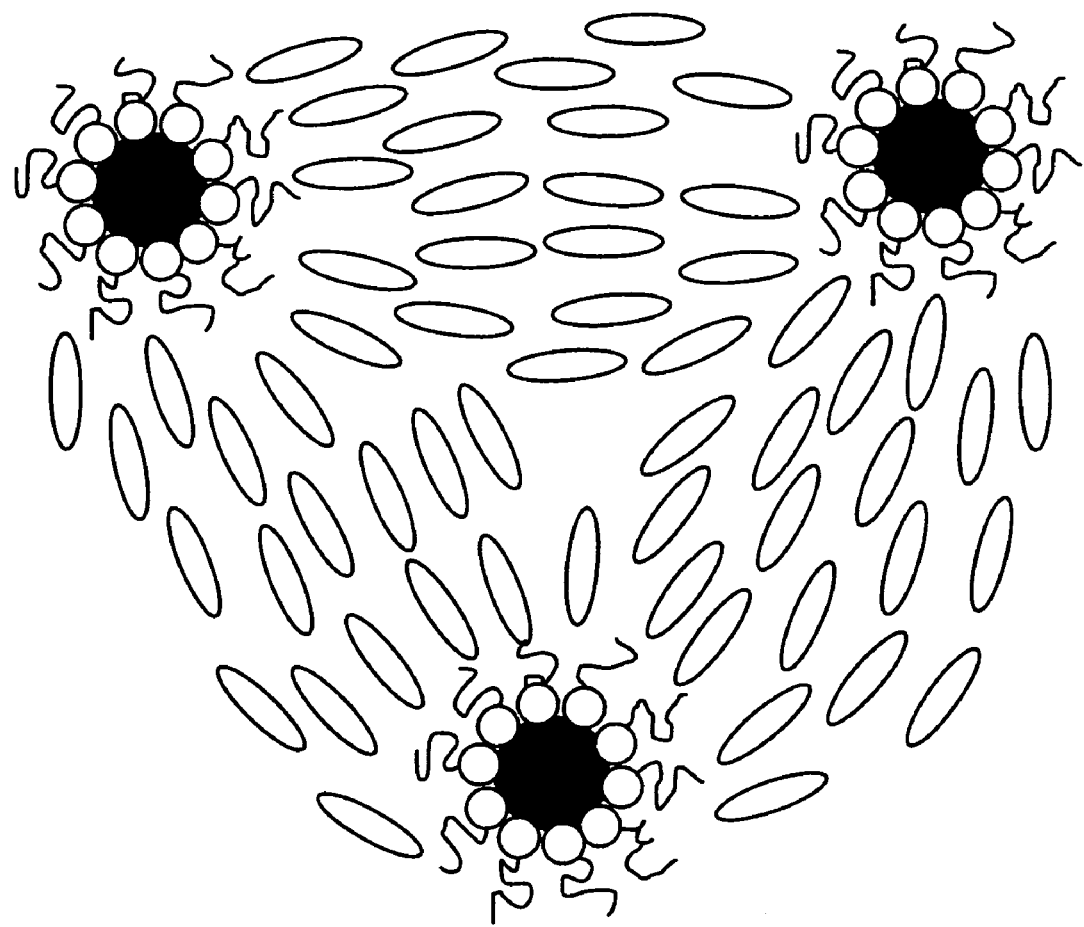
FIG. 12 is a schematic view illustrating a structure of a liquid crystal micro emulsion.

One specific example of the liquid crystal micro emersion may be a mixture system of (a) Pentylcyanobiphenyl (5CB), a thermotropic liquid crystal (temperature-transition-type liquid crystal) exhibiting a Nematic liquid crystal phase, described in the foregoing "liquid crystal micro emersion", and (b) an aqueous solution of Didodecyl ammonium bromide (DDAB), that is a lyotropic liquid crystal (concentration-transition-type liquid crystal) exhibiting a reverse micelle phase. The mixture system has a structure illustrated in the schematic views of FIGS. 11 and 12. Further, in this mixture system, the diameter of each reverse micelle is typically about 50 Å, and each distance between the respective inverse phases is about 200 Å. These scales are approximately 10 times smaller than the optical length. That is, the foregoing mixture system (liquid crystal micro emersion) has an alignment order (orderly structure) smaller than the optical wavelength. Further, in this mixture system, the reverse micelles exist at random in a three-dimensional space, and the 5CBs are radially extended from each reverse micelle. Accordingly, the foregoing mixture system exhibits optical isotropy.

Then, when a field is applied to the medium made of the foregoing mixture system, due to the dielectric isotropy of the 5CB, the molecules are attracted to the direction of the field. That is, alignment anisotropy is expressed in the system that was optically isotropic and the 5CB were radially aligned around the reverse micelles, thereby causing an optical anisotropic. Therefore, the mixture system may be used for the medium sealed in the material layer 3 of the display element of the present embodiment. Note that, in addition to the foregoing mixture system, any liquid crystal micro emersion causing a change in degree of the optical anisotropy depending on whether a field is applied or not may be used for the medium sealed in the material layer 3 of the display element of the present embodiment.

Medium Example 5

Figure 13:
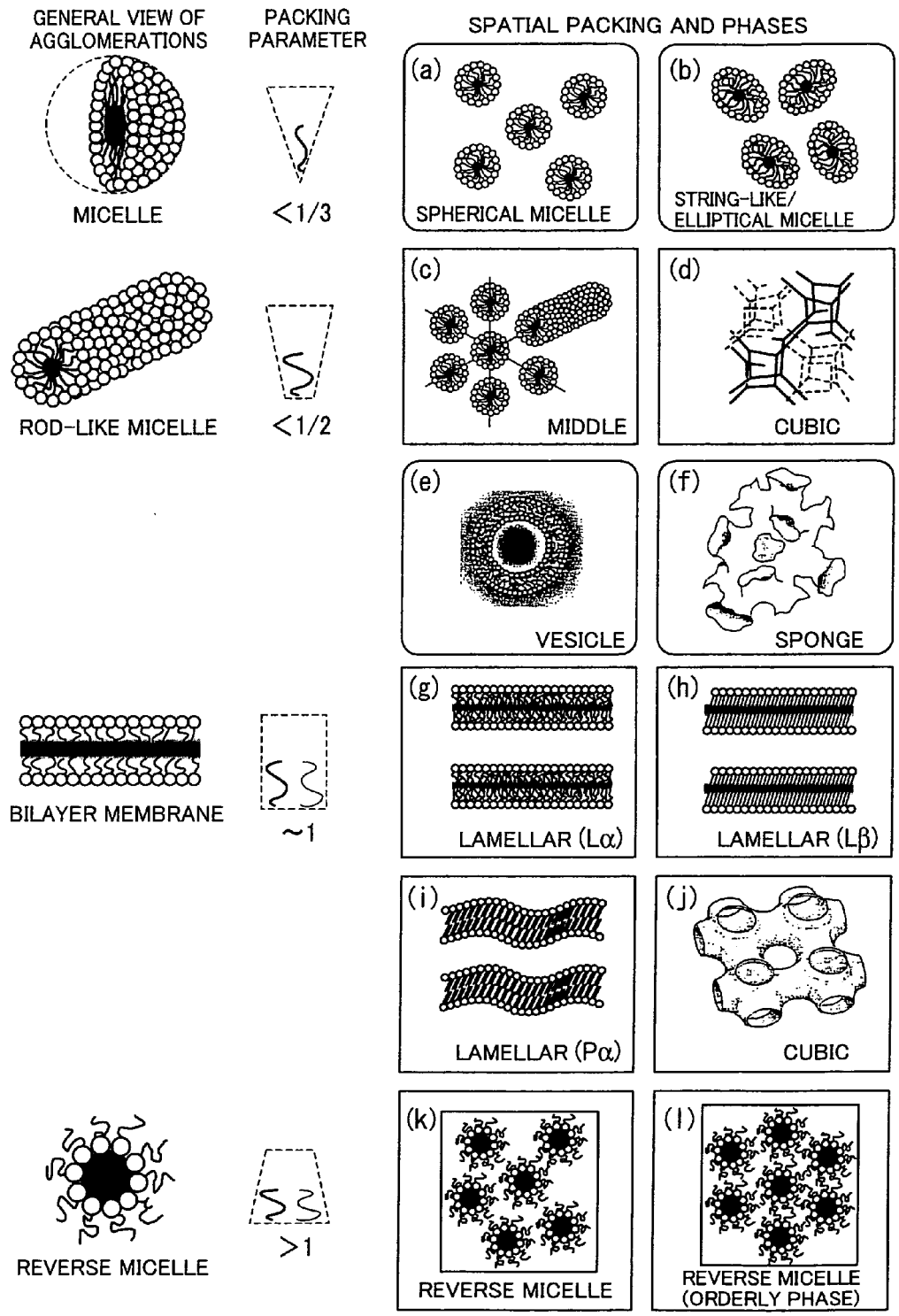
FIG. 13 is classification diagram of a lyotropic liquid crystal phase.

Still another example of the medium to be sealed in the material layer 3 of the present display device may be lyotropic liquid crystal with a particular phases. The lyotropic liquid crystal here is referred to as liquid crystal in which the general molecules which the liquid crystal comprises are dissolved in a solvent (water, organic solvent etc.) having a different property. Further, the particular phase here is referred to as a phase that causes a change in degree of optical anisotropic depending on whether a field is applied or not. Such a particular phase may be the micelle phase, the sponge phase, the cubic phase, or the reverse micelle phase, described in Jun Yamamoto "First lecture of liquid crystal science experiment: Identification of liquid crystal phase: (4) Lyotropic liquid crystal" EKISHO, 2002, Vol. 6, No. 1, p. 72-83. FIG. 13 shows a classification of the lyotropic liquid crystal phase.

A surfactant has an amphipathic property, and thus comprises a material expressing a micelle phase. For example, an ionic surfactant, such as an aqueous solution of the sodium dodecyl sulfate or an aqueous solution of palmitic acid potassium, forms a spherical micelle. Further, in a mixture liquid of polyoxyethylenenonylphenylether and water, the nonylphenyl group functions as a hydrophobic group, and the oxyethylene chain functions as a hydrophilic group, thus forming a micelle. An aqueous solution of styrene-ethylene oxide block copolymer also forms a micelle.

For example, in the spherical micelle, the molecules form a spherical shape by being packed (forming molecule aggregation) in the whole space of the micelle. Further, since the size of the spherical micelle is smaller than the optical wavelength, it appears to be isotropic in the range of optical wavelength without exhibiting anisotropy. More specifically, the spherical micelle has an orderly structure (alignment order) smaller than optical wavelength. However, when a voltage is applied to such a spherical micelle, the spherical micelle is distorted, thus expressing anisotropy. Therefore, the lyotropic liquid crystal exhibited by the spherical micelle may be adopted as the medium sealed in the material layer 3 of the display device of the present embodiment. Note that, the medium is however not limited to the spherical micelle but other micelles, for example, a lyotropic liquid crystal exhibiting a string-like micelle phase, an elliptical micelle phase, a rod-like micelle phase may be sealed in the material layer to obtain the same effect.

Further, generally, a reverse micelle phase in which a hydrophilic group and a hydrophobic group are exchanged the spherical micelle phase is often formed depending on the conditions such as concentration, temperature, the type of surfactant etc. The reverse micelle shows the same optical effect as the normal micelle. Therefore, by adopting the lyptropic liquid crystal exhibiting the reverse micelle phase as the medium sealed in the material layer 3, the same effect as when using the lyotropic liquid crystal can be obtained. Note that, the liquid crystal micro emersion explained in the medium example 2 is one of the lyotropic liquid crystal exhibiting the reverse micelle phase (reverse micelle structure).

Further, as shown in FIG. 13, the aqueous solution of non-ionic surfactant pentaethylenglychol-dodecylether ($C_{12}E_5$) includes a region that with concentration and temperature exhibiting a sponge phase or a cubic phase. The sponge phase or the cubic phase has an orderly structure (orderly structure, alignment order) smaller than the optical wavelength, and is transparent in the optical wavelength range. Accordingly, the medium made of such a phase exhibits optical isotropy. Further, when a field is applied to the medium made of such a phase, the alignment order (orderly structure) is distorted, thus expressing optical anisotropy. Therefore, the lyotropic liquid crystal exhibiting the sponge phase or the cubic phase may be adopted for the medium sealed in the material layer 3 of the display device of the present embodiment.

Medium Example 6

The medium sealed in the material layer 3 of the present display device may be a liquid crystal fine particle dispersion system that exhibits the phase whose degree of optical anisotropy is changed depending on whether a field is applied or not. Such a system may be a micelle phase, a sponge phase, a cubic phase, or a reverse micelle phase. Here, a liquid crystal fine particle dispersion system refers to a mixture system made of a solvent (liquid crystal) mixed with fine particles.

One of examples of the liquid crystal fine particle dispersion system may be a system made of an aqueous solution of non-ionic surfactant pentaethylenglychol-dodecylether ($C_{12}E_5$) mixed with latex fine particles, each of which has a diameter=100 Å, and the surface thereof is modified with a sulfuric group. The liquid crystal fine particle dispersion system expresses a sponge phase that has an alignment order (orderly structure) smaller than the optical wavelength. Accordingly, as with the foregoing medium example 3, the foregoing liquid crystal fine particle dispersion system may be adopted for the medium sealed in the material layer 3 of the display device of the present embodiment.

Note that, by replacing the latex fine particles with DDAB of the liquid crystal emersion of the Medium Example 2, the same alignment structure as that in the liquid crystal micro emersion of the Medium Example 2 can be obtained.

It is preferable that one kind of the fine particles or two or more kinds of the fine particles be dispersed in a solvent.

It is preferable that the fine particles have an average particle diameter of 0.2 μm or less. When the fine particles having an average particle diameter of 0.2 μm or less are used, dispersibility in the dielectric material layer 3 is stable. Therefore, even after a long time, the fine particles do not aggregate, and the phase does not split. Thus, it is possible to sufficiently suppress such condition that: the fine particles are precipitated and become locally uneven, so that the display element becomes uneven.

It is preferable that a distance between the particles be 200 nm or less. It is more preferable that the distance between the particles be 190 nm or less.

When a beam of light is incident on particles dispersed three-dimensionally, a diffraction ray is generated in a certain wavelength. When the diffraction ray is suppressed, the optical isotropy is improved and the contrast of the display element is also improved.

The wavelength λ of light to be diffracted can be obtained by a formula "λ=2d", although the wavelength λ may change according to an incident angle of the beam of light. Here, d is the distance between the particles.

When the wavelength of the diffraction ray is 400 nm or less, it is almost impossible to recognize the diffraction ray with human eyes. Therefore, it is preferable that λ≦400 nm. In this case, the distance d between the particles may be 200 nm or less.

Further, according to the CIE (Commission Internationale de l'Eclairage), it is determined that the wavelength unrecognizable for human eyes is 380 nm or less. Therefore, it is further preferable that λ≦380 nm. The particle-particle distance d of 190 nm or less allows attaining that λ≦380 nm.

Further, if the particle-particle distance was too long, the particle-particle interaction would not work sufficiently, and thus it would become difficult for the phase (micelle phase, sponge phase, cubic phase, reverse micelle phase) to occur. For this reason again, it is preferable that particle-particle distance be 200 nm or less, and it is further preferable that particle-particle distance be 190 nm or less.

Further, it is preferable that the concentration (particulate content) of the particulates in the material layer 3 be in a range between 0.05 wt % and 20 wt % with respect to a total weight of the medium sealed between the substrates so as to form the material layer 3. By arranging such that the particle content is in the range between 0.05 wt % and 20 wt % in the material layer 3, it is possible to prevent the agglomeration of the particulates.

Note that, the particulates to be added in the material layer 3 is not particularly limited and may be transparent or may not be transparent. Moreover, the particulates may be organic particulates such as a polymer, or may be inorganic particulates or metallic particulates.

As the organic particulates, for example, fine particles in polymer beads form are preferable, such as polystyrene beads, polymethylmethacrylate beads, polyhydroxyacrylate, divinylbenzene beads. Moreover, the particulates may be cross-linked or may not be cross-linked. As the inorganic particulates, for example, particulates such as glass beads, silica beads or the like are preferable.

As the metallic particulates, alkali metal, alkali earth metal, transition metal, rare earth metal are preferable. For example, particulates made of titania, alumina, palladium, silver, gold, copper, or an oxide of these metals can be preferably used as the metallic particulates. These metallic particulates may be made of sole metal or may be made of an alloy of two or more of them or a complex of two or more of them. For example, particulates prepared by covering silver particulates with a metal such a titania, palladium, or the like may be used. The silver particulates themselves would possibly cause characteristics of the display element by oxidation of silver. By covering the surfaces of the silver particulates with a metal such as palladium, it is possible to prevent the oxidation of silver. Moreover, the metallic particulates in the beads form may be used as such, or may be used after subjected to heat treatment or adding an organic material to the surfaces of the beads. The organic material to be added is preferably liquid crystalline. For example, a compound represented by the following structural Formula (5) is preferable. By applying an organic material exhibiting liquid crystal property on the beads surface, the molecules on the periphery of the medium (dielectric material) are more easily aligned. That is, it has superior function as the alignment auxiliary material (alignment controlling ability increases).

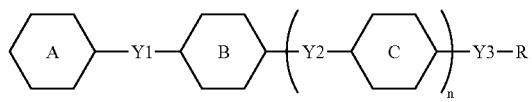

(5)

where n is an integer in a range of 0 to 2, and a six-membered ring A is preferably any one of the following functional groups:

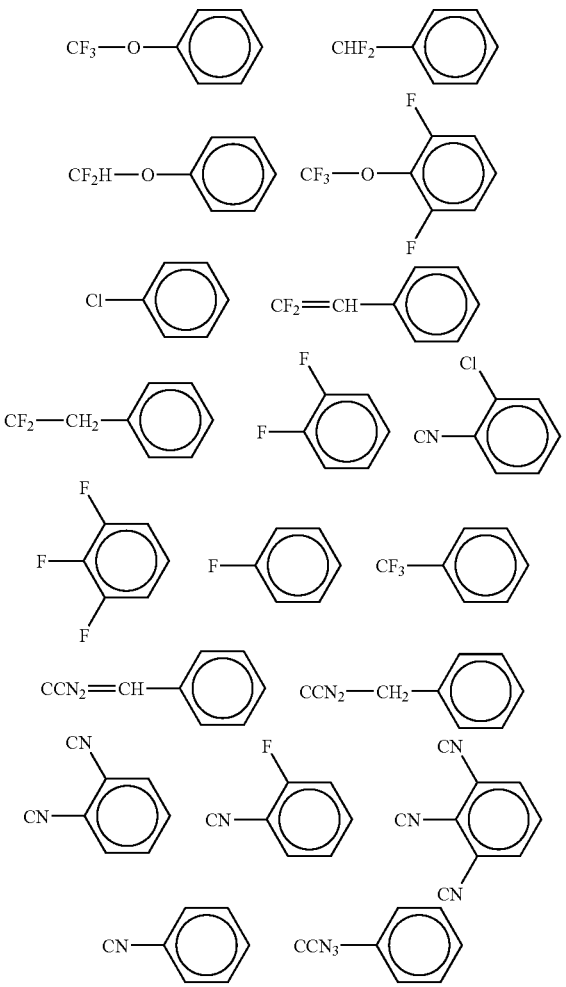

Six-membered rings B and C may be, but not limited to, substituents having a six-membered ring structure such as 1,4-phenylene group or 1,4-trans-cyclohexyl group (trans-1, 4-cyclohexylene group), and the like, provided that the six-membered rings B and C have any one of the following substituents:

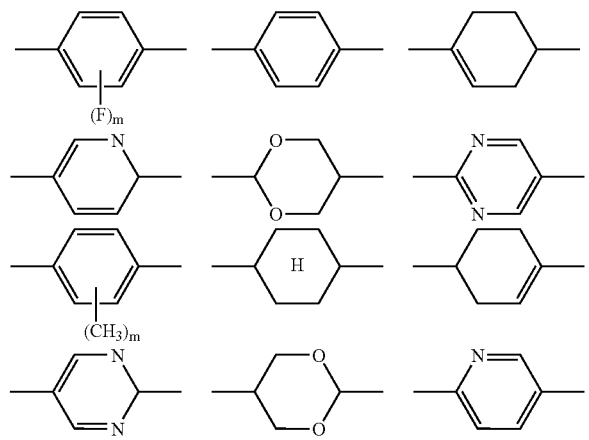

Note that, in the substituents, m is an integer in a range of from 1 to 4. The six-membered rings B and C may be identical the same substituent, or respectively different substituents.

Further, in the structural Formula (5), Y1, Y2, and Y3 are independently an alkyl group or an alkenyl group, which is straight chained or branched and has ten carbon atoms or less. One $CH_2$ or non-adjacent two $CH_2$ in the group may be independently substituted with —O—, —S—, —CO—O— and/or —O—CO—, and may include a single bond, —$CH_2CH_2$—, —$CH_2O$—, —$OCH_2$—, —OCO—, COO—, —CH=CH—, —C≡C—, —CF=CF—, —$(CH_2)_4$—, —$CH_2CH_2CH_2O$—, —$OCH_2CH_2CH_2$—, —CH=$CHCH_2CH_2O$—, or —$CH_2CH_2$CH=CH—. Moreover, Y1, Y2, and Y3 may comprise a chiral carbon or not. Moreover, Y1, Y2, Y3 may be identical with each other or different from each other, as long as they have any one of the above structures. Further, two of Y1, Y2, Y3 may be identical with each other, while the last of them is different from the two.

Further, in the structural Formula (5), R is any one of a hydrogen atom, a halogen atom, a cyano group, an alkyl group of a carbon number of 1 to 20, an alkenyl group of a carbon number of 1 to 20, or alkoxyl group of a carbon number of 1 to 20.

Further, it is preferable that the organic material to be added on the surfaces of the metallic particulates be not less than 1 mole but not more than 50 moles with respect to 1 mole of the metal.

For example, the metallic particulates to which the organic material is added may be prepared by mixing the organic material in a solvent in which metal ions are solved or dispersed, and then reducing the metal ions. The solvent may be water, an alcohol, an ether, or the like.

Further, the particulates to be dispersed may be in a form of fullerene, and/or in a carbon nano tube. The fullerene should be such that carbon atoms are arranged in a spherical shell configuration therein. For example, a preferable fullerene is such that has a stable structure having a carbon number n of 24 to 96. An example of such fullerene is, for example, a spherical closed-shell carbon molecular structure of C60 (comprising 60 carbon atoms). Moreover, as the carbon nano tube, for example, a tube-like shaped nano tube is preferable, in which carbon atoms are arranged a graphite-like plane cured into the tube like shape of thickness of several atoms.

Further, the shape of the particulates is not particularly limited. For example, the shape may be a spherical shape, ellipsoidal shape, agglomeration-like shape, column-like shape, cone-like shape, any of these shapes with protrusion, or any of these shapes with a hole. Further, the particulates are not particularly limited in terms of their surface state. For example, the particulates may have a flat surface or a non-flat surface, or may have a hole or a groove.

Medium Example 7

A dendrimer (dendrimer molecules) may be used for the medium sealed in the material layer 3 of the present display device. The dendrimer here refers to a three-dimensional highly-branched polymer that is branched for each monomer.

As it has many branches, the dendrimer forms a spherical structure when it comprises a certain amount of molecules. This spherical structure has an order (orderly structure, alignment order) smaller the optical wavelength, and therefore is transparent in the optical wavelength range, and is changed in degree of alignment order in response to the field application, thereby expressing an optical anisotropy (changing in degree of optical anisotropy). Therefore, the dendrimer may be adopted for the medium sealed in the material layer 3.

Further, by replacing the dendrimer material with DDAB of the liquid crystal micro emersion of the Medium Example 2, the same alignment structure as that in the liquid crystal micro emersion of the medium example 2 can be obtained. On this account, the dendrimer may be used for the medium sealed in the material layer 3 of the display device of the present embodiment.

Medium Example 8

The medium sealed in the material layer 3 of the present display device may be a medium made of molecules exhibiting a cholesteric blue phase. Note that, FIG. 13 illustrate a schematic structure of a cholesteric blue phase.

As shown in FIG. 13, the cholesteric blue phase has a highly-symmetrical structure. Further, the cholesteric blue phase has an order (orderly structure, alignment order) smaller than the optical wavelength, and therefore is substantially transparent in the optical wavelength range, and is changed in degree of alignment order in response to the field application, thereby expressing an optical anisotropy (changing in degree of optical anisotropy). That is, the cholesteric blue phase is substantially optically isotropic, and when a field is applied, the molecules are attracted to the electric filed direction, thus causing distortion in the lattice structure. As a result, an optical anisotropy is expressed in the material layer 3. Therefore, the medium made of a cholesteric blue phase may be adopted for the medium sealed in the material layer 3 of the display device of the present embodiment.

One of the examples of the material exhibiting a cholesteric blue phase may be a mixture material of 48.2 mol % of JC1041 (Nematic liquid crystal mixture material, Chisso. Co), 47.4 mol % of 5CB (4-cyano-4'-pentyl biphenol, Nematic liquid crystal mixture, product of Aldrich Co. Ltd.) and 4.4 mol % of ZLI-4572 (chiral agent, product of Merck Co. Ltd). The material exhibits a cholesteric blue phase at a temperature range from 330.7K to 331.8K.

Further, other material exhibiting a cholesteric blue phase may be, for example, a mixture material made of ZLI-2293 (mixed liquid crystal, Merck Co. Ltd)=67.1 mol %, P8PIMB (1,3-phenylene bis [4-(4-8-alkylphenyliminomethyl-benzoate, banana-like shape (curved) liquid crystal, see the following structural formula (6))=15 wt %, and MLC-6248 (chiral agent, Merck Co. Ltd)=17.9 wt %. This mixture material exhibits a cholesteric blue phase at a temperature range of 77.2° C. to 82.1° C.

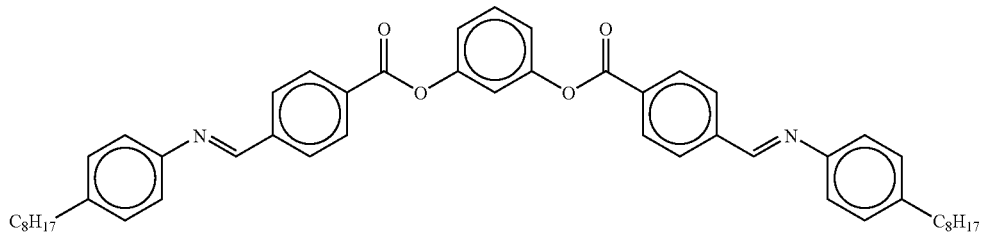

(6)

Further, different suitable materials may be created by appropriately changing the foregoing mixture ratios. For example, a material made of ZLI-2293=69.7 wt %, P8PIMB=15 wt %, and MLC-6248 (chiral agent)=15.3 wt % exhibits a cholesteric blue phase at a temperature range of 80.8° C. to 81.6° C.

Further, still another material exhibiting a cholesteric blue phase may be, for example, a mixture material made of ZLI-2293 (mixed liquid crystal, Merck Co. Ltd)=67.1 wt %, MHPOBC (4-(1-methylheptyloxycarbonyl) phenyl-4'-octylcarboxybiphenyl-4-carboxylate, linear liquid crystal, see the following structural formula (7))=15 wt %, and MLC-6248 (chiral agent, Merck Co. Ltd)=17.9 wt %. This mixture material exhibits a cholesteric blue phase at a temperature range of 83.6° C. to 87.9° C.

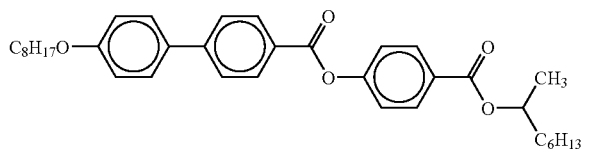

(7)

As with the case above, different suitable materials may be prepared also in this case by changing the foregoing mixture ratios. For example, a material made of ZLI-2293=69.7 wt %, MHPOBC=15 wt %, and MLC-6248 (chiral agent)=15.3 wt % exhibits a cholesteric blue phase at a temperature range of 87.8° C. to 88.4° C.

Note that, the mixture of ZLI-2293 and MLC-6248 did not exhibit a cholesteric blue phase; however, by addition of the banana-shaped (curved) liquid crystal P8PIMB or the linear liquid crystal MHPOBC, the mixture exhibited a cholesteric blue phase.

Further, in the foregoing example, a lasemic body is used as a linear liquid crystal; however it may instead be, for example, a chiral body. Further, in the case of using a linear liquid crystal, one having a contragradient structure (each layer faces different direction), such as a linear liquid crystal MHPOBC is particular preferable.

Further, linear liquid crystal is a general name in the chemical structural formula denoting a liquid crystal molecule that appears to be substantially linear oblong shape. This may be tacit understanding, but the actual configuration of the linear liquid crystal does not always exist within one plane, but may be bent.

Further, the banana-shaped (curved) liquid crystal is a general name in the chemical structural formula denoting a liquid crystal molecule having a curving portion, and this is not limited to P8PIMB. For example, the curving portion in the chemical structural formula may be a benzene ring such as a phenylene group, otherwise, it may be one coupled by a naphthalene ring, a methylene chain or the like. The following structural formulas (8) through (11) denote example compounds of the banana-shaped liquid crystal.

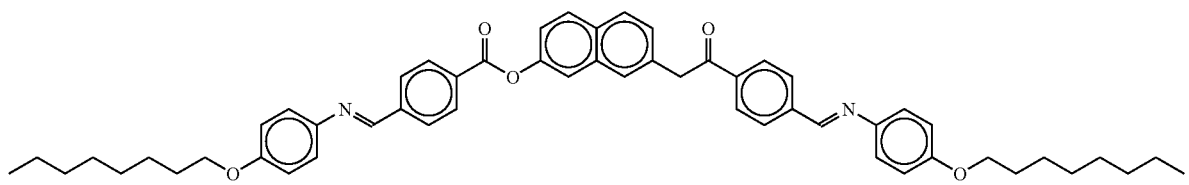

(8)

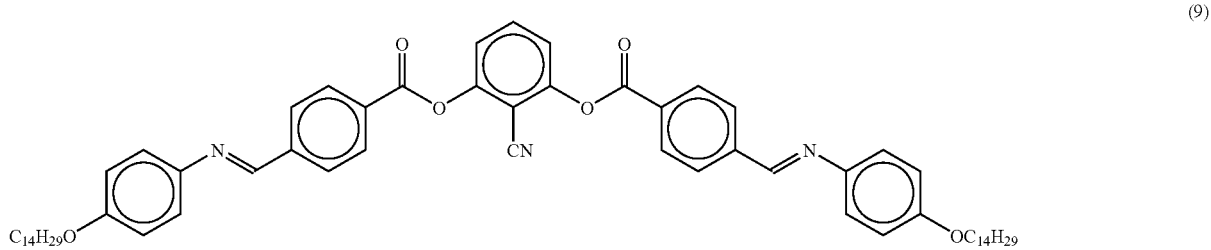

(9)

-continued

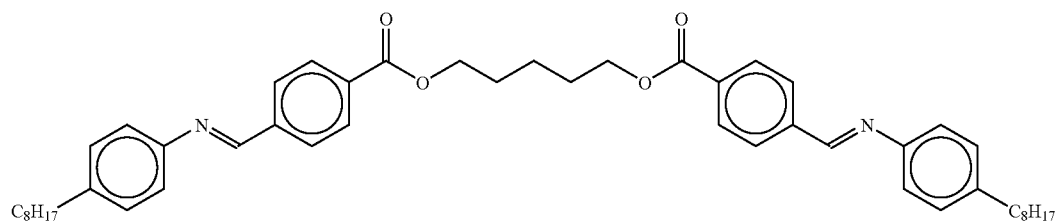
(10)

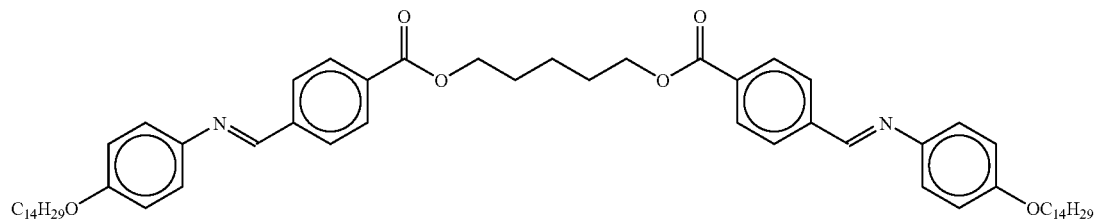
(11)

Further, the banana-shaped (curved) liquid crystal material may comprise an azo group. The compound denoted by the structural formula (12) below is an example of the banana-shaped (curved) liquid crystal.

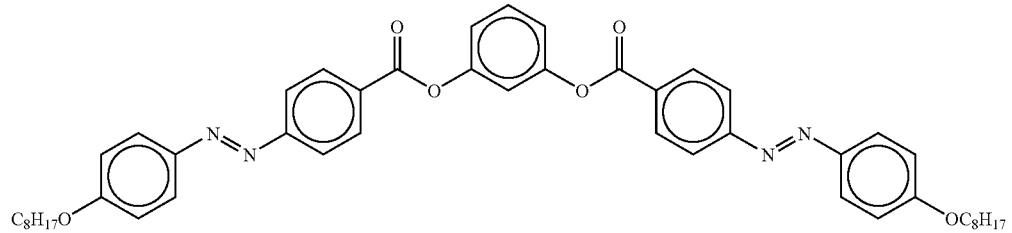
(12)

Further, in the foregoing example, the banana-shaped (curved) liquid crystal material has a horizontally symmetrical chemical structure in the bonding portion, but it may have a horizontally asymmetrical chemical structure in the bonding (curving) portion. The compound denoted by the structural formula (13) below is an example of the banana-shaped (curved) liquid crystal.

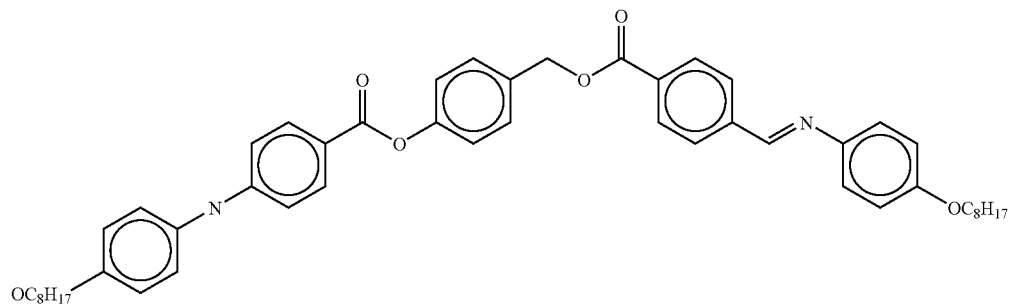
(13)

Further, though the banana-shaped (curved) liquid crystal molecules in the foregoing example do not comprise a chiral carbon, it may comprise one or more chiral carbon(s). The compound denoted by the structural formula (14) below is an example of the banana-shaped (curved) liquid crystal.

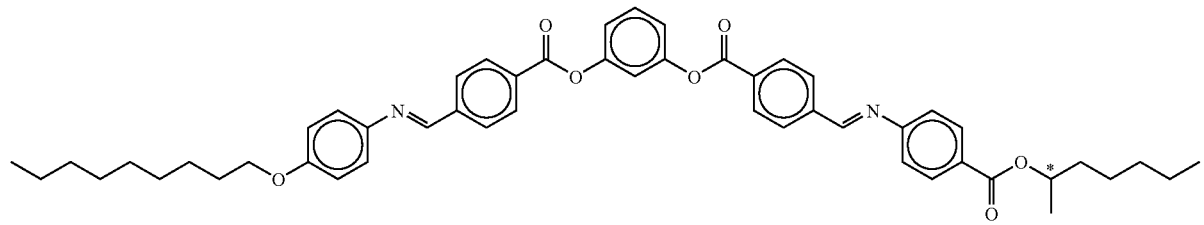

(14)

Further, as described, the cholesteric blue phase applicable to the present invention has a defective order smaller than the optical wavelength, so that the material is substantially transparent in the optical wavelength region, and is substantially optically isotropic. Here, "the material is substantially optically isotropic" means the following condition: the cholesteric blue phase shows the optical isotropy except for a coloring by a helical pitch. Note that, the cholesteric blue phase shows a color reflecting a helical pitch of the liquid crystal. Note that, a phenomenon of selectively reflecting light having the wavelength reflecting the helical pitch is called a selective reflection. When the wavelength band of the selective reflection is not in the visible range, the color is not shown (the color is not recognized by human eyes). When the wavelength band of the selective reflection is in the visible range, the color corresponding to the wavelength is shown.

Here, when the selective reflection wavelength range or the helical pitch is equal to or greater than 400 nm, the cholesteric blue phase (blue phase) displays a color corresponding to the helical pitch. More specifically, visible light is reflected, and the reflection produces color recognizable by human. Therefore, for example, when the display element of the present invention is equipped with full-color display function and mounted to a TV or the like, reflection peak is not preferably in a visible range.

Note that, the selective reflection wavelength also depends on the incident angle to the helical axis of the medium. Therefore, when the structure of the medium is not one-dimensional but, for example, three-dimensional as with the cholesteric blue phase, the incident angle to the light helical axis has distribution, meaning that the width of the selective reflection wavelength also has distribution.

In this view, it is preferable that the blue phase has the selective reflection wavelength range or the helical pitch not more than visible range, i.e., not more than 400 nm. If the blue phase has the selective reflection wavelength range or the helical pitch not more than 400 nm, the displayed color explained above becomes invisible by human.

Further, according to the CIE (Commission Internationale de l'Eclairage), it is determined that the wavelength unrecognizable for human eyes is 380 nm or less. Therefore, it is further preferable that the blue phase has the selective reflection wavelength range or the helical pitch≦380 nm. In this case, it is possible to securely prevent such a displayed color from being visible by human.

Further, the color on display depends on not only the helical pitch and the incident angle but also the average refractive index of the medium. The light of the displayed color here mainly has wavelength $\lambda = nP$, and the wavelength width $\Delta\lambda = P\Delta n$. Here, n denotes the average refractive index, and P denotes the helical pitch. Further, $\Delta n$ denotes anisotropy of refractive index.

$\Delta n$ differs depending on the material, but when a liquid crystal material is used as a material sealed in the material layer 3, since a general liquid crystal material has average refractive index=approximately 1.5, and $\Delta n$=approximately 0.1, the helical pitch P has to be P=400/1.5=267 nm to make the display color invisible when $\lambda$=400. Further, $\Delta\lambda$ is 26.7 according to 0.1×267. More specifically, to make the color invisible by human, the helical pitch of the medium has to be not more than 253 nm, this is obtained by subtracting 13.4 nm, a half of 26.7 nm, from 267 nm. Accordingly, to prevent the display of color mentioned above, the helical pitch of the medium is preferably not more than 253 nm.

Further, in the foregoing example, $\lambda$ is set to 400 nm in the formula $\lambda$=nP; however, when $\lambda$ is set to 380 nm, that is the unrecognizable wavelength for human eyes according to the CIE (Commission Internationale de l'Eclairage), the helical pitch for making the color invisible becomes equal to or less than 240 nm. That is, by setting the helical pitch of the medium to 240 nm or less, it is possible to securely prevent such a displayed color from being visible by human.

For example, a sample prepared with a mixture of JC1041 (mixture liquid crystal, Chisso Co. Ltd)=50.0 wt %, 5CB (4-cyano-4'-pentyl biphenyl, Nematic liquid crystal)=38.5 wt %, and ZLI-4572 (chiral dopent, Merck Co. Ltd)=11.5 wt % causes phase transition from liquid isotropy to optical isotropy at 53° C. or a lower temperature; however, since it has a helical pitch=approximately 220 nm, that is equal to or less than the visible range, the color was not displayed.

As described, the cholesteric blue phase suitable for the present invention has a defective order smaller than the optical wavelength. The defective structure is caused by great alignment difference between adjacent molecules, and therefore the medium exhibiting the cholesteric blue phase needs to have a chiral property to produce a great twisted structure. Then, to express a great twisted structure, it is preferable that a chiral agent is added to the medium as with the foregoing medium example.

The ideal concentration of the chiral agent depends on the torsion ability of the chiral agent, but a preferable concentration may be 8 wt % or 4 mol %. When a polymer network (obtained by photopolymerization of photosensitive monomer) is used to enlarge the temperature range exhibiting the cholesteric blue phase, the chiral agent in an amount of equal to or greater than 8 wt % or 4 mol % increases the temperature range of cholesteric blue phase to approximately 1° C. or more. On the other hand, the chiral agent less than 8 wt % or 4 mol % reduces the temperature range of cholesteric blue phase.

Further, the concentration of the chiral agent is preferably at or greater than 11.5 wt %. With the chiral agent with a concentration equal to or more than 11.5 wt %, the helical pitch becomes approximately 220 nm, and the color was not displayed.

Further, it is more preferable that the concentration of the chiral agent is at or greater than 15 wt %. When a banana-shaped (curved) liquid crystal or a linear liquid crystal having a contragradient structure is added to express the cholesteric blue phase, the chiral agent with a concentration equal to or greater than 15 wt % increases the temperature range of cholesteric blue phase to approximately 1° C. or more. When using a chiral agent in which the concentration is further increased to 17.9 wt %, the temperature range of the cholesteric blue phase is further enlarged.

As described, a chiral agent with a higher concentration is preferred, as it eases expression of the cholesteric blue phase, and the helical pitch of the cholesteric blue phase is reduced. However, when an excessive amount of chiral agent is added, the liquid crystal property of the entire material layer 3 decreases. Insufficient liquid crystal property brings about a decrease in degree of generation of the optical anisotropy upon field application, thereby decreasing function of the display element. Further, the decrease in the liquid crystal property also causes a decrease in stability of the cholesteric blue phase, which interferes the enlargement of temperature range of the cholesteric blue phase. The upper limit of the addition amount of the chiral agent can be decided according to the foregoing view, that was figured out as 80 wt % by the inventors of the present invention. More specifically, the concentration of the chiral agent is preferably not more than 80 wt %.

Further, in the present embodiment, the chiral agent is not limited to the foregoing mixture agent of ZLI-4572 and MLC-6248 used in the example above. For example, a commodity, such as S811 (E, Merck Co. Ltd) may be used. Further, an axial asymmetry chiral agent may also be used. The axial asymmetry chiral agent may be an axial asymmetry binaphthyl derivative (see the compound (15) below), for example.

n=7, the compound exhibits a blue phase at a temperature range from approximately 103° C. to 94° C. Therefore, when the compound (15) solely exhibits the blue phase (when there is a liquid crystal property), the compound (15) may be used as a medium sealed in the material layer 3. Further, the compound (15) may also be used as a chiral agent.

Note that, in the foregoing example, the effect of the addition of chiral agent to the cholesteric blue phase was explained; however, the effect of the addition of chiral agent is not limited only to the cholesteric blue phase, but also useful for a medium exhibiting other liquid crystal phases, such as a smectic blue phase or a Nematic phase etc.

Medium Example 9

The medium sealed in the material layer 3 of the present display device may be a medium made of molecules exhibiting a smectic blue phase ($BP_{sm}$). FIG. 13 illustrates a schematic structure of a smectic blue phase.

As with the cholesteric blue phase, a smectic blue phase has a highly-symmetrical structure as shown in FIG. 13. Further, the smectic blue phase has an order (orderly structure, alignment order) smaller than the optical wavelength, and therefore is substantially transparent in the optical wavelength range, and is changed in degree of alignment order in response to the field application, thereby expressing an optical anisotropy (changing in degree of optical anisotropy). That is, the smectic blue phase is substantially optically isotropic, and when a field is applied, the molecules are attracted to the electric filed direction, thus causing distortion in the lattice structure. As a result, an optical anisotropy is expressed in the material layer 3. Therefore, the medium made of a smectic blue phase may be adopted for the medium sealed in the material layer 3 of the display device of the present embodiment. Note that, one of the examples of the material exhibiting a smectic blue phase may be FH/FH/HH-14BT-MHC described in "*Structural Investigations on Smectic Blue Phases*" Eric Grelet and three other researchers, PHYSICAL REVIEW LETTERS, The American Physical Society, Apr. 23, 2001, VOLUME 86, NUMBER 17, p. 3791-3794. This material exhibits $BP_{sm3}$ phase at a temperature range 74.4° C. to

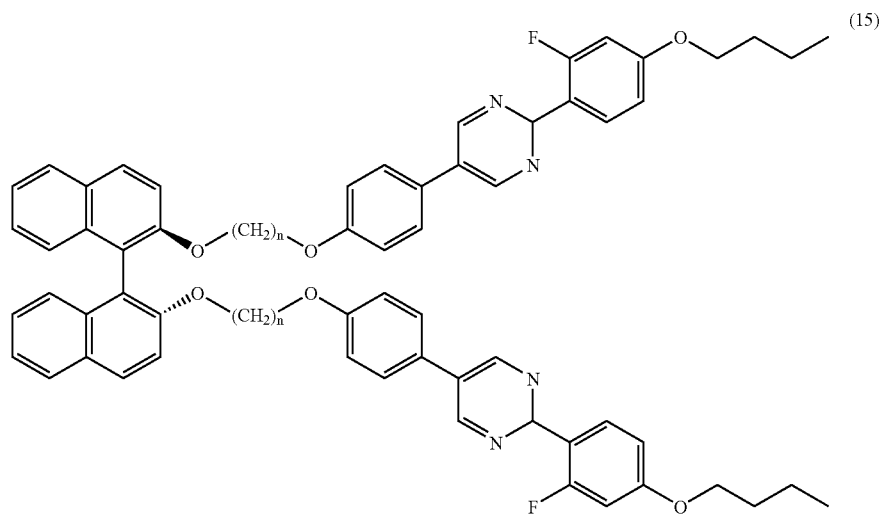

(15)

where n is an integer from 4 to 14.

Note that, the compound (15) solely exhibits a blue phase in some cases when n is an odd number. For example, when 73.2° C., exhibits $BP_{sm2}$ phase at a temperature range 73.2° C. to 72.3° C., and exhibits $BP_{sm1}$ phase at a temperature range 72.3° C. to 72.1° C.

Further, as with the case of using a cholesteric blue phase, it is preferable in the use of a smectic blue phase that the blue phase has the selective reflection wavelength range or the helical pitch is not more than 400 nm, more preferably not more than 380 nm. Further, the helical pitch is preferably not more than 253 nm, more preferably not more than 240 nm.

Further, the medium used for the material 3 of the display element of the present invention has at least an orderly structure (alignment order) smaller than the optical wavelength and is changed in degree of optical anisotropy in response to field application. As long as it has this characteristic, for example, a material having a similar phase to the smectic blue phase or the cholesteric blue phase may be used.

The following compounds (16) and (17) are examples of the material having a similar phase to the smectic blue phase or the cholesteric blue phase.

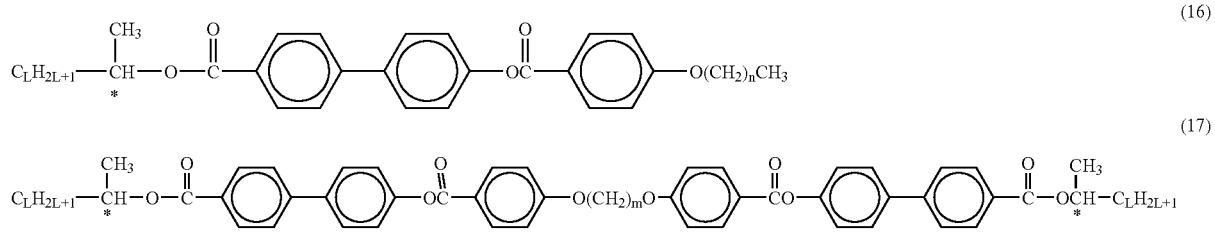

where L denotes one of integers 2-10, m denotes one of integers 2-14, and n denotes one of integers 0-6.

Note that, when the compound (16) and the compound (17) are mixed, they are preferably mixed according to the relation: $2\times(n+1)=m$. Further, the ratios of the compounds (16) and (17) may be changed accordingly. For example, when the same amounts of compounds (16) and (17) are mixed when L=6, m=6, n=2, the resulting mixture exhibits the phase (orderly structure (alignment order) smaller than the optical wavelength) similar to the smectic blue phase at a temperature range from 143° C. to 130° C. Further, when the compounds (16) and (17) are mixed at a ratio of 30:70 when L=6, m=6, n=2, the resulting mixture exhibits a phase having the orderly structure (alignment order) smaller than the optical wavelength at a temperature range from 132° C. to 120° C.

Further, in the material layer (medium sealed in the dielectric layer 3) exhibiting a Nematic phase, when the refractive index anisotropy at 550 nm=Δn, and the dielectric constant anisotropy at 1 kHz=Δ∈, Δn×Δ∈ preferably becomes 2.9 or greater.

Here, the refractive anisotropy (Δn) is expressed as: Δn=ne−no where ne expresses refractive index (abnormal light refractive index) of the major axis direction (direction of components of the polarization of light wave), and no expresses refractive index (normal light refractive index) of the perpendicular direction to the major axis of the ellipsoid (direction of components of the polarization of light wave). More specifically, in the present invention, the refractive index anisotropy (Δn) denotes the birefringence expressed as Δn=ne−no (ne: abnormal light refractive index, no: normal light refractive index).

Further, the dielectric constant anisotropy (change in dielectric constant) (Δ∈) denotes anisotropy of dielectric constant, and is expressed as Δ∈=∈e−∈o where ∈e denotes dielectric constant in the major axis direction of liquid crystal molecule, and ∈o denotes dielectric constant in the minor axis direction of the liquid crystal molecule.

Next, the following explains a measurement result of drive voltage for the display element of the present embodiment in which the liquid crystal fine particle dispersion system described in Medium Example 4 above is sealed in the material layer 3.

The foregoing compound (1) is used as a solvent. In this dielectric material (liquid crystal fine particle dispersion system, Δn×Δ∈ was found as 2.2. Further, the thickness of the material layer 3, and distance between pectination electrodes 4 and 5 are adjusted to 10 μm and 3.3 μm, respectively. Note that, the refractive index anisotropy Δn was measured by an Abbe refractometer (ATAGO Co. Ltd. "4T") at a wavelength=550 nm, and the dielectric constant anisotropy Δ∈ was measured by an impedance analyzer (Toyo Corporation "SI1260") at a frequency of 1 kHz.

Transmittance of the display element of the present embodiment thus created is measured at varied drive voltages. The maximum transmittance was obtained at a drive voltage of 28V (see FIG. 24).

According to "Handbook of Liquid Crystals", Vol. 1, p. 484-485, Wiley-VCH, 1998, the birefringence Δn (E) generated by application of field is expressed as: $\Delta n\,(E)=\lambda BE^2$ where λ denotes wavelength of light, B denotes Kerr constant, and E denotes strength of the applied field.

Further, with the change in birefringence, the transmittance T changes as follows: $T=\sin^2(\pi\times\Delta n\,(E)\times d/\lambda)=\sin^2(\pi BE^2 d)$. Here, d denotes thickness of the material layer 3. Therefore, according to this formula, the transmittance becomes maximum when $\pi BE^2 d=\pi/2$.

Further, the relation: $\Delta B=\Delta n(E)/\lambda E^2=\Delta n Q(E)/\lambda E^2$ is found according to the foregoing formula. Here, Q (E) denotes alignment order parameter.

Further, [Handbook of Liquid Crystals], Vol. 1, p. 484-485, Wiley-VCH, 1998 describes the relation:

$Q\propto\Delta\in\times E^2$.

Therefore, the drive voltage V for obtaining the maximum transmittance is expressed as: $V=ES=S\times\text{sqrt}\,(1/(2\times B\times d\propto S\times\text{sqrt}\,(1/(\Delta n\times\Delta\in)\times d)$ where S denotes the distance between the pectination electrodes 4 and 5.

Figure 24:
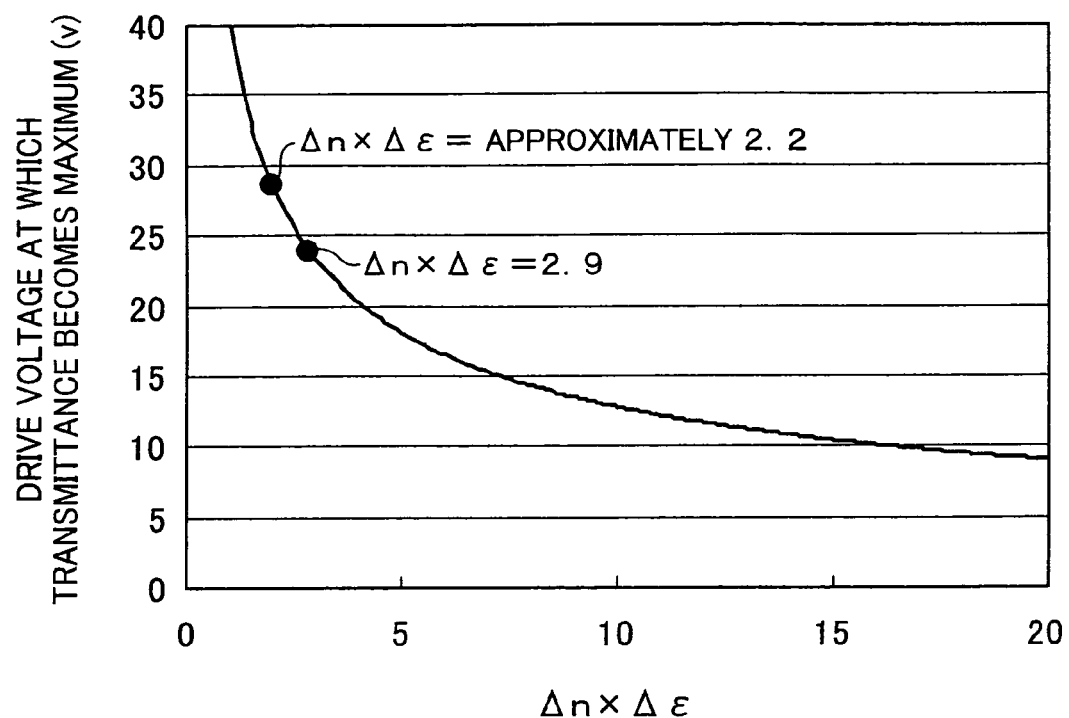
FIG. 24 is a graph illustrating a relation between (i) a voltage value at which transmittance is utmost, estimated from a measured voltage-transmittance property of the display element according to one embodiment of the present invention, and (ii) product (Δn×Δ∈) of refractive index anisotropy Δn and dielectric constant Δ∈.

According to the result above, FIG. 24 shows the relation between Δn×Δ∈ and the voltage value (V (V)) for obtaining the maximum transmittance, which relation is figured out according to the voltage-transmittance characteristic of the display element comprising the foregoing material, and the formula showing the relation of the drive voltage and Δn×Δ∈.

As shown in FIG. 24, when the dielectric material satisfying Δn (refractive index anisotropy)×Δ∈ (dielectric constant anisotropy)=not less than 2.9 is used, and the thickness of the material layer 3 and distance between pectination electrodes 4 and 5 are adjusted to 10 µm and 3.3 µm, respectively, the maximum transmittance was obtained by a drive voltage=24V.

When the display element of the present embodiment is adopted for an active-matrix display device, a switching element (TFT element) is provided for ON/OFF control of a field supplied to the pectination electrodes 4 and 5. Then, a gate electrode having optimal thickness and quality is provided in the switching element (TFT), and the withstand voltage to be applied to the gate voltage was measured, which was found as 63V. Accordingly, the maximum voltage value allowed to be supplied to the material layer 3 was found as 48 Vpp by subtracting the voltage (10V) when the gate voltage has a low potential (when the gate voltage is ON) and the voltage (−5V) when the gate voltage has a low potential (when the gate voltage is OFF) from the withstand voltage (63−10−5=48 Vpp (peak-to-peak)). As the effective value (rms: root-mean-square), this maximum value is expressed as: ±24V.

Accordingly, when the thickness of the material layer 3 and distance between pectination electrodes 4 and 5 are adjusted to 10 µm and 3.3 µm, respectively, the maximum transmittance can be obtained by using the dielectric material satisfying Δn (refractive index anisotropy)×Δ∈ (dielectric constant anisotropy)=not less than 2.9.

Note that, the following compound (18) is an example of the dielectric material satisfying Δn (refractive index anisotropy)×Δ∈ (dielectric constant anisotropy)=not less than 2.9.

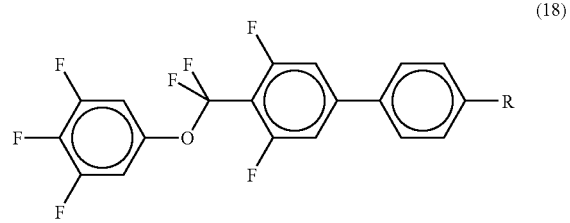

(18)

where R expresses an alkyl group. In this compound (18), Δ∈=approximately 25, Δn=approximately 0.15, and Δn×Δ∈=3.75.

Further, in the display device of the present embodiment having pectination electrodes, reduction of the drive voltage for obtaining the maximum transmittance can be attained by decreasing the distance between those pectination electrodes. However, in consideration of manufacturing accuracy, process margin, process cost etc., there is a limit for reduction of the distance between the pectination electrodes.

Further, in the display element of the present embodiment having the pectination electrodes, further reduction of the drive voltage for obtaining the maximum transmittance can be attained by increasing the thickness of the dielectric layer 3. However, an increase in thickness of the material layer 3 is not necessarily completely proportional to an increase in thickness contributing the field application. Therefore, an increase in thickness of the dielectric later 3 from 10 µm is not always effective for reduction of the drive voltage.

Example 2

In the display device of this example, the medium sealed in the dielectric material layer 3 is made of a transparent material 4'-n-alkoxy-3'-nitrobiphenyl-4-carboxylic acids (ANBC-22). ANBC-22 has the chemical structure of the compound (3), where n=22.

The substrates 1 and 2 are each made of a glass substrate, and the gap therebetween comprises some beads dispersed so that the gap has a 4 µm thickness. That is, the thickness of the material layer 3 is adjusted to 4 µm.

The electrodes 4 and 5 are transparent electrodes made of ITO. Further, polyimide alignment films having been rubbed are formed on the inner surfaces (opposed surfaces). Note that, the rubbing is preferably performed in consideration of making the medium sealed in the dielectric layer 3 to be in a light state when the medium is exhibiting a smectic C phase; typically, it is preferable that the rubbing direction creates an 45° angle with the axis of the polarizer 6/7. Note that, the alignment film on the substrate 1 is formed by covering the electrodes 4 and 5.

As shown in FIGS. 2(a) and 2(b), the polarizers 6 and 7 are provided on the outer sides of the substrates 1 and 2, i.e., the sides opposite to the opposed inner surfaces. Here, the polarizers 6 and 7 are so bonded that their absorption axes are orthogonal to each other, and the directions to which the pectination portions of the electrodes 4 and 5 extend and the absorption axes of the polarizers 6 and 7 respectively make 45° angles.

The display element thus obtained exhibits a smectic C phase at a temperature less than the smectic C phase-cubic phase transition temperature. Note that, the smectic C phase expresses an optical anisotropy when no field is applied.

The display element thus prepared is kept at a temperature near above the smectic C phase-cubic phase transition temperature (that is, at a temperature ranging from the phase transition temperature to −10K of the phase transition temperature) by using an external heating device, so as to allow the element to change in transmittance, that was caused by electric field application (application of an alternating field of approximately 50V (frequency was larger than 0, up to several hundreds kHz) between the electrodes 4 and 5. More specifically, the smectic C phase (light state), that had exhibited an optical anisotropy in the absence of electric field, was caused to exhibit an isotropic cubic phase (dark state) by field application. That is, the display element exhibits optical anisotropy in the absence of electric field, and exhibits optical isotropy in the presence of electric field. Note that, here, the refractive index ellipsoid changes from an ellipsoid (in the absence of electric field) into a sphere (in the presence of electric field).

The foregoing example uses a medium that exhibits an optical anisotropy in the presence of electric field, and loses optical anisotropy in the absence of electric field, thereby exhibiting optical isotropy, as the medium sealed into the dielectric material layer 3. As described above, the display quality was also desirable in this display device.

Further, the respective angles created by the absorption axes of the polarizers 6 and 7 and the electrodes 4 and 5 are not limited to 45°. For example, a desirable display was successfully carried out at some varied angles from 0° to 90°. This is because the medium is in a light state in the absence of electric field, more specifically, this condition of light state is achieved by the relation of the rubbing directions of the alignment films and the absorption axes of the deflector plates. Further, this display element creates the dark state by the field induction phase transition into the optical isotropy of the medium due to field application, and therefore, it is only required that the absorption axes of the polarizers are orthogonal to each other, and the relation between the absorption axes of the polarizers and the directions of the pectination electrodes does not contribute to the display. Further, the alignment treatment (rubbing treatment) is not always required. For example, a desirable display was also performed in an amorphous alignment state (random alignment state)

Further, as described, the medium used for the display element of the present invention may be a medium used for a conventional liquid crystal display device, or a medium that changes in degree of optical anisotropy in response to electric field (external field) application.

The medium that changes in degree of optical anisotropy in response to electric field (external field) application may be a medium in which the orderly structure (alignment order) is changed in response to electric field (external field) application. One specific example may be a medium which have an orderly structure equal to or smaller than the optical wavelength in the presence or absence of electric field, and the degree of orderly structure changes in response to application of electric field, which further causes a change in degree of optical anisotropy. Another example may be a medium having an orderly structure exhibiting an optical anisotropy in the absence of electric field (external field), and the orderly structure changes in response to application of electric field, which further causes a change in degree of optical anisotropy In this case, unlike the conventional liquid crystal display element using the change in alignment direction of liquid crystal molecules, the particular viscosity of liquid crystal does not greatly influence the response speed. Therefore it is possible to realize higher response speed than that of the conventional liquid crystal display element. Further, in this case, the medium has only to be kept at such a temperature that the medium exhibits a predetermined orderly structure when an external field is applied or when no external field is applied (a state in which the application of the external field distorts the orderly structure so that its optical anisotropy varies), so that it is easy to control the temperature. For example, according to the display device like the one disclosed in Tokukai 2001-249363 which is based on a conventional electric optical effect using electron deviation in polar molecules which is caused by the field application, its driving temperature range is limited to a vicinity of a liquid crystal phase transition point, and therefore very precise temperature control is required. In contrast, according to the foregoing arrangement, the medium has only to be kept at such a temperature that the medium exhibits a predetermined orderly structure when an external field is applied or when no external field is applied The display device of the present invention therefore allows very easy temperature control.

For example, in the case of using BABH8 as the medium, the medium is set under the temperature range of 24.3K (136.7 to 161° C.) to be kept in the state where the degree of optical anisotropy changes in response to application of electric field (external field). Further, in the case of using ANBC16 as the medium, the medium is set under the temperature range of 26.2K (171.0 to 197° C.) to be kept in the state where the degree of optical anisotropy changes in response to application of electric field (external field). Note that, the upper limit of the temperature to keep the medium in the state where the degree of optical anisotropy changes in response to application of electric field (external field) is not particularly limited; that is, the foregoing medium may be realized by a medium that exhibits a predetermined orderly structure under a wider temperature range than the ranges above. Further, the lower limit of the temperature range to cause the medium to exhibit a predetermined orderly structure in the presence/absence of external field is preferably 0.1K or higher, more preferably 1K or higher.

Second Embodiment

Figure 14:
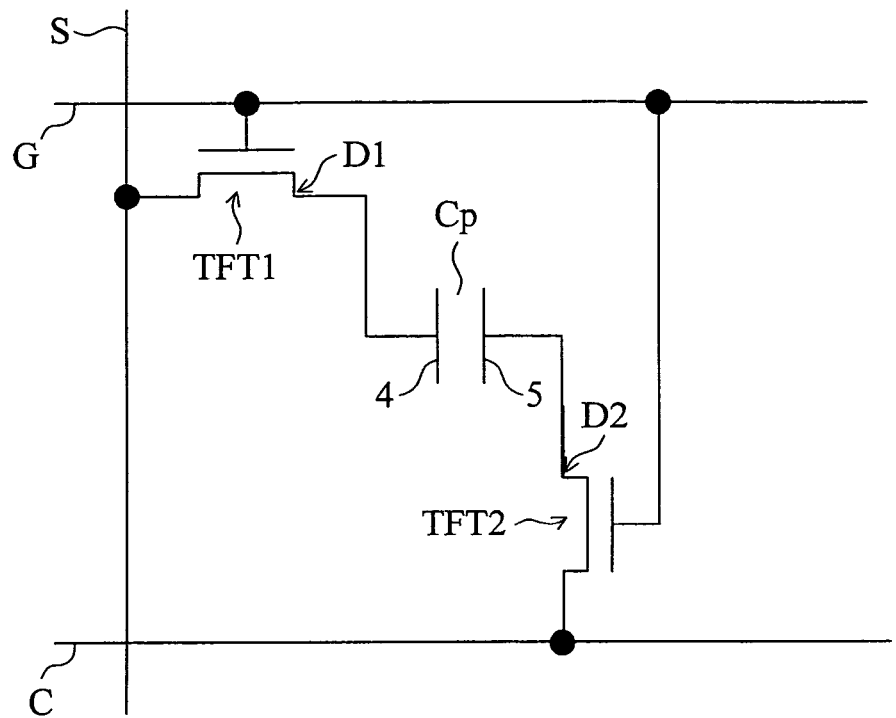
FIG. 14 is an equivalent circuit diagram showing a circuit layout of each display element in a display device according to another embodiment of the present invention.

The following will explain another embodiment of the display device of the present invention with reference to FIG. 14. For ease of explanation, materials having the equivalent functions as those shown in the drawings pertaining to First Embodiment above will be given the same reference symbols, and explanation thereof will be omitted here.

The display device according to the present embodiment has a similar structure to that of the display element 10 shown in FIGS. 2(a), 2(b) and 3, but there is a difference in the circuit structure connected to the electrodes 4 and 5, that is, the layout of the switching elements TFT1 and TFT2, the signal line, and the scanning line. Note that, as with the display device of First Embodiment, the display device according to the present embodiment has an arrangement in which the electrodes 4 and 5 are connected to the separate wires via separate switching elements TFT1 and TFT2. Further, the medium sealed in the dielectric material layer 3 may be realized by the same medium used in First Embodiment.

FIG. 14 is an equivalent circuit diagram showing a circuit arrangement of a display device according to the present embodiment. As shown in the figure, the display device according to the present embodiment includes a capacitor Cp constituted of the electrodes 4 and 5. The electrode 4 is connected to the signal line S via the switching element TFT1, and the electrode 5 is connected to the counter electrode line C via the switching element TFT2. In other words, the display device according to the present embodiment is arranged so that the electrodes 4 and 5 are connected to the signal line S and the counter electrode line C respectively via the separate electrodes TFT1 and TFT2. The display device of the present invention carries out display by applying a voltage to the signal line S and the counter electrode line C, generating an electric field in the dielectric material layer 3. Note that, the voltage applied to the signal line S and the counter electrode line C is the same as that of the conventional liquid crystal display device, and therefore the explanation is omitted here.

In the display device according to the present embodiment, a signal is written between the two electrodes of the element capacitor Cp (display element) by turning on the switching elements TFT1 and TFT2. Then, when the switching elements TFT1 and TFT2 are turned off, the potential of the counter electrode line C varies but the potential difference between the electrodes 4 and 5 is kept constant. More specifically, during the writing of an inversed polarity into another electrode (not shown) connected to another scanning line, the potential difference between the electrodes 4 and 5 of the element capacitor Cp is kept at a constant level.

Therefore, unlike the conventional liquid crystal display device, the problem of fluctuation of drain potential does not occur, and therefore the gate voltage for driving the switching element TFT does not need to be increased.

On this account, in the display device according to the present embodiment, the voltage applied to the scanning line G can be reduced, and durability of the switching elements TFT 1 and TFT 2 increases. Further, for example, even when a large voltage is applied to the signal line so as to increase the drive voltage, the durability of the switching elements TFT 1 and TFT 2 will not be decreased. This effect of the present display device allows high voltage driving. On this account a display device ensuring both high speed response characteristic and a high viewing angle characteristic is realized.

Further, unlike the display device of First Embodiment, the display device according to the present embodiment does not need two signal lines for each of the display elements (pixels). On this account, the number of signal lines is reduced half compared with the display device of First Embodiment. This simplification of structure results in an increase in yield in the manufacturing of the display device.

Further, the display device according to the present embodiment may have an auxiliary capacitor. In this case, the auxiliary capacitor is connected in parallel to the element capacitor Cp (the electrodes 4 and 5), for example. As an alternative layout, two auxiliary capacitors Cs1 and Cs2 and an auxiliary capacitor wire may be used. In this case, one of the terminals of the auxiliary capacitors Cs1 is connected to the electrode 4, while the other is connected to the auxiliary capacitor wire. Similarly, one of the electrodes of auxiliary capacitors Cs2 is connected to the electrode 5, while the other is connected to the auxiliary capacitor wire. With this structure having auxiliary capacitors, the influence of leak current in the switching element TFT 1/2 is reduced.

Figure 22:
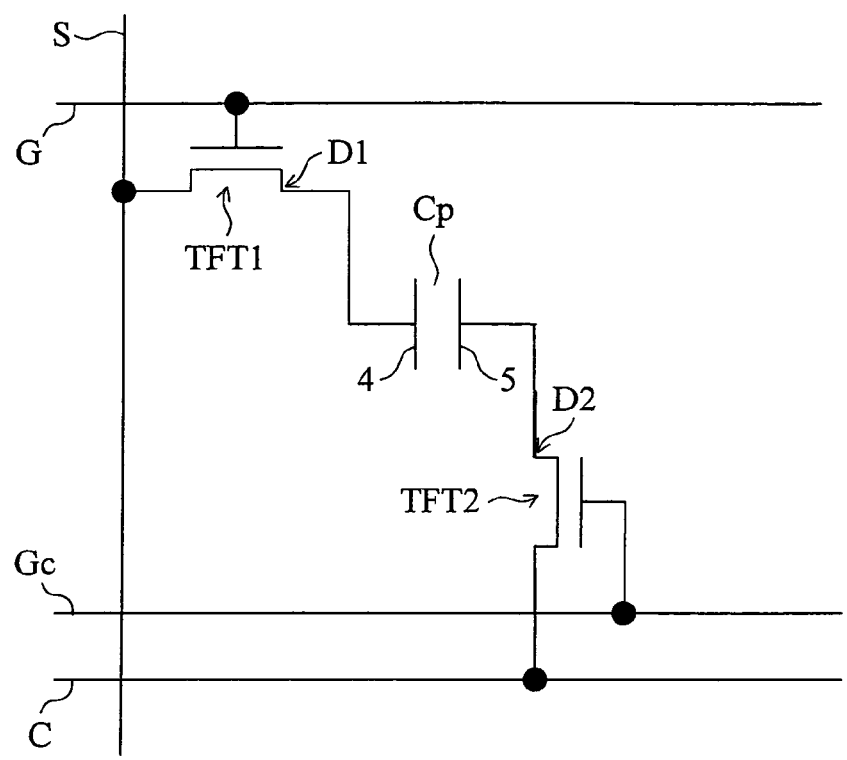
FIG. 22 is an equivalent circuit diagram showing an example of circuit structure with two electrodes which are formed on two different substrates in a display device according to the present invention.

Further, in the present display device, the electrodes 4 and 5 are formed only on the substrate 1, but they may be formed both on the substrates 1 and 2. For example, structure of FIG. 14 may be modified by forming the counter electrode 5 on the substrate 2. FIG. 22 shows an equivalent circuit diagram of this structure.

In this example, if the counter electrode 5 is provided on the substrate 2, the switching element TFT2 and the scanning line Gc are also formed on the substrate 2.

Figure 23:
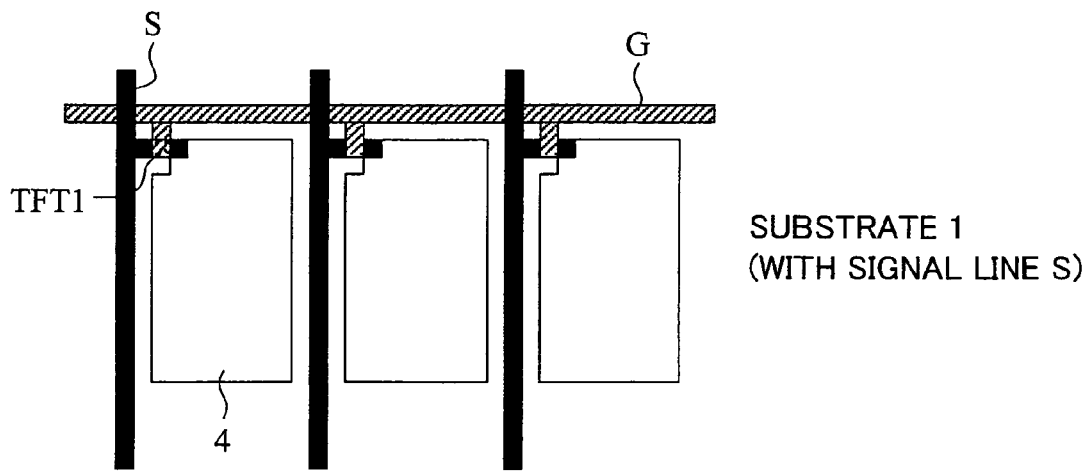
FIG. 23(*a*) is a schematic wiring view of one of the substrates in the display device of FIG. 22.
Figure 23:
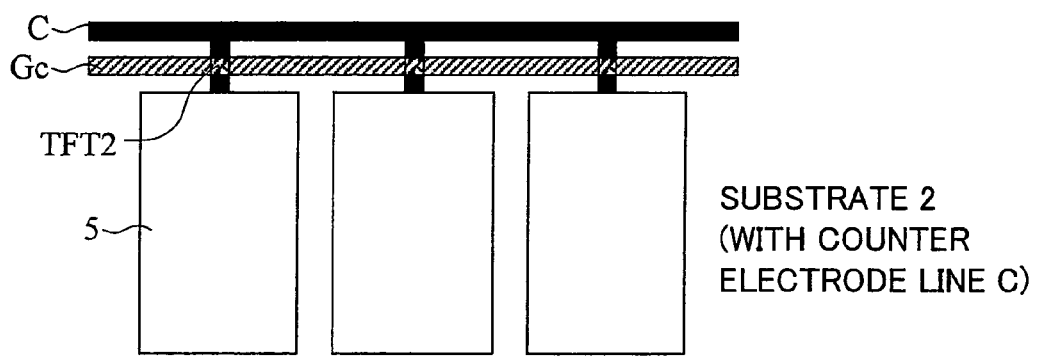
Figure 23:
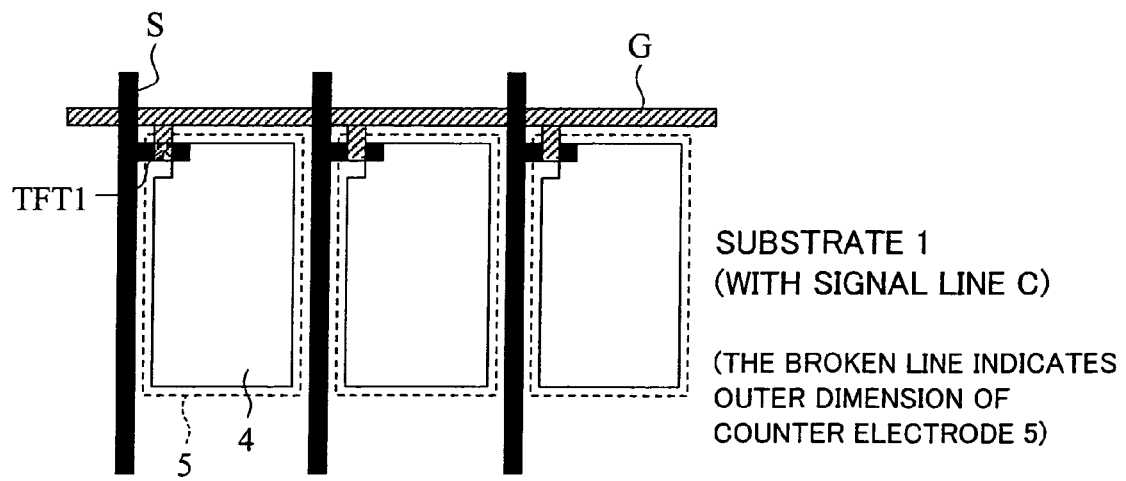

FIGS. 23(*a*) through 23(*c*) illustrate schematic wiring layouts in this case. Specifically, FIG. 23(*a*) is a schematic wiring view of the substrate 1 where the signal line (signal wire) S is provided; FIG. 23(*b*) is a schematic wiring view of the substrate 2 where the counter electrode line (counter electrode wire) C is provided. FIG. 23(*c*) is a schematic wiring view FIG. 23(*c*) is a schematic wiring view showing relative positions of signal electrode 4 and the counter electrode 5 when viewed from the substrate 1.

As shown in FIG. 23(*a*), the substrate 1 has an equivalent layout to that of the substrate of conventional TN-type display (conventional TFT substrate). Further, as shown in FIGS. 23(*b*) and 23(*c*), the substrate 2 has counter electrodes 5 corresponding to the electrodes 4 (pixel electrodes) of the substrate 1. Note that, as shown in FIG. 23(*b*), the counter electrodes 5 are connected to the counter electrode line C which is shared by all pixels. The gate electrode of the switching element TFT2 is connected to the scanning line Gc.

In this structure, the switching elements TFT2 on the substrate 2 are connected to the single common counter electrode line C. Therefore, it is not necessary to establish connection between the signal line and individual switching elements TFT which respectively correspond to the plural pixels. On this account, the yield increases. As another advantage, the substrate 2 does not need to be conducted to the source driver.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The display device of the present invention is applicable for wide fields, for example, image display devices such as a television and a monitor, and image display devices provided on: OA (Office Automation) equipments such as a word processor, or a personal computer; and information terminals such as a video camera, a digital camera, and a mobile phone. Further, with this advantage of high-speed response, the display device of the present embodiment is suitable for a display device using a field sequential color method or the like.

The invention claimed is:

1. A display device comprising
a pair of substrates, at least one of which is transparent,
a medium provided between the substrates, and
a display element including a first electrode and a second electrode for applying an electric field to the medium so as to carry out a display, the first electrode and the second electrode being connected to separate switching elements, a degree of optical anisotropy in the medium changing in response to application of electric field, and wherein a shape of a refractive index ellipsoid of the medium changes from substantially isotropic to substantially anisotropic, or vice versa, when the switching elements are changed from an OFF state to an ON state.

2. The display device as set forth in claim 1, wherein the display device includes a plurality of the display elements, each of which includes a first signal line and a second signal line, and the first electrode and the second electrode being connected to separate signal lines via separate switching elements.

3. The display device as set forth in claim 1, wherein the display device includes (i) a plurality of the display elements; (ii) a plurality of signal lines corresponding to the display elements; and (iii) a common counter electrode line to be shared by all of the display elements, the first electrode is connected to the signal line via a switching element, and the second electrode is connected to the common counter electrode line via a switching element other than the switching element to which the first electrode is connected.

4. The display device as set forth in claim 1, wherein a refractive index of the medium changes in proportion to square of the electric field.

5. The display device as set forth in claim 1, wherein the medium contains a liquid crystal material.

6. The display device as set forth in claim 1, wherein the medium contains polar molecules.

7. The display device as set forth in claim 1, wherein the medium exhibits optical isotropy in the absence of the electric field, and the medium exhibits optical anisotropy in the presence of the electric field.

8. The display device as set forth in claim 1, wherein the medium exhibits the optical anisotropy in the absence of the electric field, and the medium exhibits optical isotropy in the presence of the electric field.

9. The display device as set forth in claim 1, wherein the medium is constituted of molecules having an orderly structure smaller than an optical wavelength either in the presence or in the absence of electric field, the orderly structure being changeable in response to application of electric field.

10. The display device as set forth in claim 1, wherein the medium has an orderly structure exhibiting a cubic symmetry.

11. The display device as set forth in claim 1, wherein the medium is constituted of molecules that exhibit a cubic phase or a smectic D phase.

12. The display device as set forth in claim 1, wherein the medium is made of a liquid crystal micro emulsion.

13. The display device as set forth in claim 1, wherein the medium is made of a lyotropic liquid crystal that exhibits a micelle phase, a reverse micelle phase, a sponge phase or a cubic phase.

14. The display device as set forth in claim 1, wherein the medium is a liquid crystal fine particle dispersed system that exhibits a micelle phase, a reverse micelle phase, a sponge phase or a cubic phase.

15. The display device as set forth in claim 1, wherein the medium is made of a dendrimer.

16. The display device as set forth in claim 1, wherein the medium is constituted of molecules that exhibit a cholesteric blue phase.

17. The display device as set forth in claim 1, wherein the medium is constituted of molecules that exhibit a smectic blue phase.

18. The display device as set forth in claim 1, wherein a selective reflection wavelength band or a helical pitch of the medium is not more than 400 nm.

19. The display device as set forth in claim 1, further comprising an auxiliary capacitor connected in parallel to the first and second electrodes.

20. The display device as set forth in claim 2, further comprising:
   a first auxiliary capacitor in which one electrode is connected to the first electrode;
   a second auxiliary capacitor in which one electrode is connected to the second electrode; and
   an auxiliary capacitor wire connected to the other electrode of the first auxiliary capacitor and the other electrode of the second auxiliary capacitor.

21. The display device as set forth in claim 1, wherein the first and second electrodes generate an electric field along a direction parallel to surfaces of the substrates.

22. The display device as set forth in claim 3, wherein the first and second electrodes are formed on separate substrates.

* * * * *